United States Patent
Kuwajima et al.

(10) Patent No.: US 10,421,257 B2
(45) Date of Patent: Sep. 24, 2019

(54) LAMINATE, METHOD FOR MANUFACTURING SAME, AND FLUORORUBBER COMPOSITION

(71) Applicant: DAIKIN INDUSTRIES, LTD., Osaka-shi, Osaka (JP)

(72) Inventors: Yuuki Kuwajima, Settsu (JP); Shoji Fukuoka, Decatur, AL (US); Kozue Komazawa, Settsu (JP); Mayuko Taeda, Settsu (JP); Junpei Terada, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 178 days.

(21) Appl. No.: 15/034,214

(22) PCT Filed: Nov. 12, 2014

(86) PCT No.: PCT/JP2014/079987
§ 371 (c)(1),
(2) Date: May 4, 2016

(87) PCT Pub. No.: WO2015/072491
PCT Pub. Date: May 21, 2015

(65) Prior Publication Data
US 2016/0288461 A1   Oct. 6, 2016

(30) Foreign Application Priority Data

Nov. 15, 2013   (JP) ................. 2013-237046

(51) Int. Cl.
| | |
|---|---|
| B32B 25/08 | (2006.01) |
| B32B 25/14 | (2006.01) |
| B32B 1/08 | (2006.01) |
| B32B 27/08 | (2006.01) |
| C08K 5/29 | (2006.01) |
| B32B 27/30 | (2006.01) |
| B32B 27/32 | (2006.01) |
| C08K 5/14 | (2006.01) |

(52) U.S. Cl.
CPC ............ *B32B 25/08* (2013.01); *B32B 1/08* (2013.01); *B32B 25/14* (2013.01); *B32B 27/304* (2013.01); *B32B 27/322* (2013.01); *C08K 5/14* (2013.01); *C08K 5/29* (2013.01); *B32B 2307/714* (2013.01); *B32B 2307/7265* (2013.01); *B32B 2581/00* (2013.01); *B32B 2597/00* (2013.01)

(58) Field of Classification Search
USPC ............... 428/421, 422; 264/209.6, 331.14
See application file for complete search history.

(56) References Cited

U.S. PATENT DOCUMENTS

| | | | | |
|---|---|---|---|---|
| 4,613,636 A * | 9/1986 | Ojakaar | ............... | C08K 5/18 524/247 |
| 5,320,888 A * | 6/1994 | Stevens | ............... | B32B 25/08 428/36.2 |
| 5,428,096 A * | 6/1995 | Fukunaga | ............ | C08K 3/0033 524/439 |
| 5,588,469 A | 12/1996 | Kakiuchi et al. | | |
| 6,221,971 B1 * | 4/2001 | Tabb | ............... | C08K 3/22 525/326.2 |
| 6,482,522 B1 * | 11/2002 | Parsonage | ............... | B32B 25/04 428/35.7 |
| 8,747,973 B2 * | 6/2014 | Shimono | ............... | B32B 27/08 428/35.7 |
| 8,759,437 B2 * | 6/2014 | Pawlik | ............... | B32B 25/08 524/504 |
| 2002/0006491 A1 * | 1/2002 | Ito | ............... | B32B 1/08 428/36.91 |
| 2008/0032080 A1 * | 2/2008 | Faulkner | ............... | C08L 27/18 428/36.91 |
| 2009/0053443 A1 * | 2/2009 | Kitahara | ............... | B32B 27/28 428/36.91 |

(Continued)

FOREIGN PATENT DOCUMENTS

| | | |
|---|---|---|
| CN | 102802941 A | 11/2012 |
| JP | 08-169085 A | 7/1996 |

(Continued)

OTHER PUBLICATIONS

International Search Report of PCT/JP2014/079987 dated Feb. 17, 2015.

(Continued)

*Primary Examiner* — Tae H Yoon
(74) *Attorney, Agent, or Firm* — Sughrue Mion, PLLC

(57) ABSTRACT

The present invention aims to provide a laminate in which a fluororesin layer and a fluororubber layer are firmly bonded even when the fluororesin layer contains a fluororesin having excellently low fuel permeability. The present invention relates to a laminate including a fluororubber layer (A) and a fluororesin layer (B) stacked on the fluororubber layer (A). The fluororubber layer (A) is a layer formed from a fluororubber composition. The fluororubber composition contains a fluororubber (a1) and a basic multifunctional compound having at least two nitrogen atoms in the molecule with a distance between the nitrogen atoms in the molecule of 5.70 Å or greater. The fluororubber (a1) has an absorption coefficient at 1720 cm$^{-1}$, determined after being brought into contact with triethyl amine, of 0.35 or lower. The fluororesin layer (B) is formed from a fluororesin (b1) having a fuel permeability coefficient of 2.0 g·mm/m$^2$/day or lower.

12 Claims, No Drawings

(56) References Cited

U.S. PATENT DOCUMENTS

| | | | |
|---|---|---|---|
| 2009/0291243 A1* | 11/2009 | Kitahara | B32B 1/08 428/36.91 |
| 2011/0135861 A1* | 6/2011 | Manzara | C08K 5/28 428/36.9 |
| 2011/0236692 A1* | 9/2011 | Luo | C09J 4/06 428/421 |
| 2011/0290363 A1* | 12/2011 | Yanagiguchi | C08L 27/18 138/137 |
| 2012/0107617 A1 | 5/2012 | Masui et al. | |

FOREIGN PATENT DOCUMENTS

| | | |
|---|---|---|
| JP | 2005-022403 A | 1/2005 |
| JP | 2010-042669 A | 2/2010 |
| JP | 2010-280103 A | 12/2010 |
| JP | 2012-061644 A | 3/2012 |

OTHER PUBLICATIONS

Communication dated Jun. 9, 2017, from the European Patent Office in counterpart European Application No. 14862699.7.
International Preliminary Report on Patentability issued from the International Bureau in counterpart International application No. PCT/JP2014/079987, dated May 17, 2016.

* cited by examiner

LAMINATE, METHOD FOR MANUFACTURING SAME, AND FLUORORUBBER COMPOSITION

CROSS REFERENCE TO RELATED APPLICATIONS

This is a National Stage of International Application No. PCT/JP2014/079987 filed Nov. 12, 2014, claiming priority based on Japanese Patent Application No. 2013-237046 filed Nov. 15, 2013, the contents of all of which are incorporated herein by reference in their entirety.

TECHNICAL FIELD

The present invention relates to laminates, methods for manufacturing the same, and fluororubber compositions.

BACKGROUND ART

A current rise in environmental awareness leads to preparation of a legal framework for preventing fuel volatilization. In particular, the field of automobiles, mainly in the United States, shows a significant tendency of suppressing fuel volatilization, and has an increasing need for materials having excellent fuel barrier properties.

Specifically, a laminated hose including a fluororesin barrier layer (layers other than the barrier layer are rubber layers) for achieving favorably low fuel permeability is used as a fuel-transporting rubber hose. Still, a strong demand for reduction in environmental load causes a requirement for much lower fuel permeability.

Fluororubber is excellent in various properties such as heat resistance, oil resistance, and aging resistance, and thus is proposed to be used as a rubber material for the layers other than the above barrier layer.

However, the fluororesin, when used for the barrier layer, has difficulty in bonding to the fluororubber, the counter material, of the inner and outer layers. In the case of using the fluororubber for the inner and outer layers, traditional techniques have only achieved relatively easy bonding between a fluororesin having poor fuel permeability and a fluororubber.

For example, Patent Literature 1 discloses a hose for fuel pipes of automobiles, including a firmly bonded laminate of an inner layer that is a molded article of a tetrafluoroethylene/hexafluoropropylene/vinylidene fluoride ternary fluororesin, an outer layer that is a cross-linked molded article of an epichlorohydrin rubber blended with a 1.8-diazabicyclo(5.4.0)undecene-7 salt and an organic phosphonium salt or a blend of NBR/PVC, and an innermost layer that is a cross-linked molded article of a composition for cross-linking of NBR rubber or fluororubber blended with a 1.8-diazabicyclo(5.4.0)undecene-7 salt and an organic phosphonium salt.

CITATION LIST

Patent Literature

Patent Literature 1: JP H08-169085 A

SUMMARY OF INVENTION

Technical Problem

In consideration of the above situation, the present invention aims to provide a laminate in which a fluororesin layer and a fluororubber layer are firmly bonded even when the fluororesin layer contains a fluororesin having excellently low fuel permeability.

Solution to Problem

The inventors have performed studies on a laminate in which a fluororesin layer and a fluororubber layer are firmly bonded even when the fluororesin layer contains a fluororesin having excellently low fuel permeability, and focused on a fluororubber composition for forming the fluororubber layer.

Then, the inventors have found that use of a fluororubber composition containing a fluororubber having an absorption coefficient at 1720 $cm^{-1}$, determined after being brought into contact with triethyl amine, within a specific range and a specific basic multifunctional compound enables firm bonding between the fluororesin layer and the fluororubber layer even when the fluororesin layer, which is the counter material, is formed from a fluororesin having excellently low fuel permeability. Thereby, the inventors have completed the present invention.

Specifically, the present invention relates to a laminate including: a fluororubber layer (A); and a fluororesin layer (B) stacked on the fluororubber layer (A), the fluororubber layer (A) being a layer formed from a fluororubber composition, the fluororubber composition containing a fluororubber (a1) and a basic multifunctional compound having at least two nitrogen atoms in the molecule with a distance between the nitrogen atoms in the molecule of 5.70 Å or greater, the fluororubber (a1) having an absorption coefficient at 1720 $cm^{-1}$, determined after being brought into contact with triethyl amine, of 0.35 or lower, the fluororesin layer (B) being formed from a fluororesin (b1) having a fuel permeability coefficient of 2.0 $g \cdot mm/m^2/day$ or lower.

The fluororesin (b1) is preferably at least one selected from the group consisting of polychlorotrifluoroethylene, a chlorotrifluoroethylene-containing copolymer, and a tetrafluoroethylene/hexafluoropropylene/vinylidene fluoride copolymer, the tetrafluoroethylene/hexafluoropropylene/vinylidene fluoride copolymer having a copolymerization ratio (mol % ratio) of tetrafluoroethylene/hexafluoropropylene/vinylidene fluoride=(75 to 95)/(0.1 to 10)/(0.1 to 19).

The fluororubber composition preferably contains a peroxide vulcanizing agent.

The fluororubber (a1) is preferably at least one selected from the group consisting of a vinylidene fluoride/$CH_2$=$CFRf^1$ copolymer (wherein $Rf^1$ is a C1-C12 linear or branched fluoroalkyl group), a tetrafluoroethylene/propylene copolymer, a tetrafluoroethylene/propylene/vinylidene fluoride copolymer, an ethylene/tetrafluoroethylene/perfluoro(alkyl vinyl ether) copolymer, a vinylidene fluoride/hexafluoropropylene/tetrafluoroethylene/perfluoro(alkyl vinyl ether)/ethylene copolymer, a vinylidene fluoride/hexafluoropropylene copolymer, and a vinylidene fluoride/hexafluoropropylene/tetrafluoroethylene copolymer.

The basic multifunctional compound preferably has two or more functional groups selected from —$NH_2$, —$NH_3^+$, —NHCOOH, —$NHCOO^-$, —N=$CR^1R^2$ (wherein $R^1$ and $R^2$ are each individually a C0-C12 organic group), —$NR^3R^4$ (wherein $R^3$ and $R^4$ are each individually a C0-C12 organic group), and —$NR^3R^4R^5$ (wherein $R^3$, $R^4$, and $R^5$ are each individually a C0-C12 organic group), and more preferably has two or more functional groups selected from —$NH_2$, —$NH_3^+$, —N=$CR^1R^2$ (wherein $R^1$ and $R^2$ are each individually a C0-C12 organic group), and —NR³R⁴R⁵ (wherein R³, R⁴, and R⁵ are each individually a C0-C12 organic group).

The basic multifunctional compound is preferably at least one selected from the group consisting of N,N'-dicinnamylidene-1,6-hexamethylenediamine and $NH_2$—$(CH_2)_n$—$NH_2$ (wherein n is 5 to 12), and more preferably at least one selected from the group consisting of N,N'-dicinnamylidene-1,6-hexamethylenediamine and hexamethylenediamine.

The laminate of the present invention preferably has an initial interlayer bond strength of 5 N/cm or higher.

In the laminate of the present invention, the fluororubber layer (A) is preferably stacked on both sides of the fluororesin layer (B).

Also, in the laminate of the present invention, the fluororesin layer (B) is preferably stacked on both sides of the fluororubber layer (A).

The laminate of the present invention preferably further includes a fluorine-free rubber layer (C1a), and the fluororubber layer (A), the fluororesin layer (B), and the fluorine-free rubber layer (C1a) are preferably stacked in the order set forth.

The laminate of the present invention preferably further includes a fluorine-free rubber layer (D1a), and the layers are preferably stacked in the order of the fluorine-free rubber layer (D1a), the fluororubber layer (A), the fluororesin layer (B), and the fluorine-free rubber layer (C1a); in the order of the fluororubber layer (A), the fluororesin layer (B), the fluorine-free rubber layer (D1a), and the fluorine-free rubber layer (C1a); or in the order of the fluororubber layer (A), the fluororesin layer (B), the fluorine-free rubber layer (C1a), and the fluorine-free rubber layer (D1a).

In the laminate of the present invention, the fluororubber layer (A) and the fluororesin layer (B) are preferably vulcanization-bonded to each other.

The present invention also relates to a method for manufacturing a laminate including: mixing a fluororubber (a1) and a basic multifunctional compound having at least two nitrogen atoms in the molecule with a distance between the nitrogen atoms in the molecule of 5.70 Å or greater to provide a fluororubber composition; stacking an unvulcanized fluororubber layer prepared by molding the fluororubber composition and a fluororesin layer; and vulcanizing the unvulcanized fluororubber layer and the fluororesin layer stacked, the fluororubber composition containing the fluororubber (a1) and the basic multifunctional compound, the fluororubber (a1) having an absorption coefficient at 1720 cm⁻¹, determined after being brought into contact with triethyl amine, of 0.35 or lower, the fluororesin layer being formed from a fluororesin (b1) having a fuel permeability coefficient of 2.0 g·mm/m²/day or lower.

The present invention also relates to a fluororubber composition including a fluororubber (a1) and a basic multifunctional compound having at least two nitrogen atoms in the molecule with a distance between the nitrogen atoms in the molecule of 5.70 Å or greater, the fluororubber (a1) having an absorption coefficient at 1720 cm⁻¹, determined after being brought into contact with triethyl amine, of 0.35 or lower.

Advantageous Effects of Invention

Since the laminate of the present invention has the aforementioned configuration, the fluororesin layer and the fluororubber layer can be firmly bonded even when the fluororesin layer contains a fluororesin having excellently low fuel permeability.

DESCRIPTION OF EMBODIMENTS

The laminate of the present invention includes a fluororubber layer (A) and a fluororesin layer (B) stacked on the fluororubber layer (A).

The respective constitutional components are described below.

(A) Fluororubber Layer

The fluororubber layer (A) is a layer formed from a fluororubber composition.

The fluororubber layer (A) is usually obtained by molding a fluororubber composition to provide an unvulcanized fluororubber layer, and then vulcanizing the unvulcanized fluororubber layer.

The fluororubber composition contains a fluororubber (a1) and a basic multifunctional compound having at least two nitrogen atoms in the molecule with a distance between the nitrogen atoms in the molecule of 5.70 Å or greater, and the fluororubber (a1) has an absorption coefficient at 1720 cm⁻¹, determined after being brought into contact with triethyl amine, of 0.35 or lower.

Combination use of the specific fluororubber and basic multifunctional compound enables firm bonding between the fluororubber layer (A) and the fluororesin layer (B) even when the fluororesin layer (B) contains a fluororesin (b1) having excellently low fuel permeability. The above fluororubber composition is also one aspect of the present invention.

The fluororubber (a1) is an unvulcanized fluororubber. The fluororubber (a1) has an absorption coefficient at 1720 cm⁻¹, determined after being brought into contact with triethyl amine, of 0.35 or lower. Use of the fluororubber (a1) having such a specific absorption coefficient enables firm bonding between the fluororubber layer (A) and the fluororesin layer (B).

In order to more firmly bond the fluororubber layer (A) and the fluororesin layer (B), the absorption coefficient at 1720 cm⁻¹ is preferably 0.25 or lower, more preferably 0.15 or lower, still more preferably 0.10 or lower. If having too high an absorption coefficient, the rubber itself is greatly deteriorated, causing a bad influence on the bonding.

In order to firmly bond the fluororubber layer (A) and the fluororesin layer (B), the absorption coefficient at 1720 cm⁻¹ is preferably 0.01 or higher, more preferably 0.03 or higher, still more preferably 0.05 or higher. If having too low an absorption coefficient, the rubber fails to form a portion required for the bonding, causing a bad influence on the bonding.

The fluororubber (a1) is usually formed from an amorphous polymer having a fluorine atom that is coupled with a carbon atom constituting the main chain and has rubber elasticity. The fluororubber (a1) usually has no obvious melting point.

The absorption coefficient at 1720 cm⁻¹ after the fluororubber (a1) is brought into contact with triethyl amine is determined by the following method.

First, 0.56 g of a polymer (fluororubber) is completely dissolved in 10 cc of acetone, tetrahydrofuran (THF), or methyl ethyl ketone (MEK), and then 4.9 g of triethyl amine is added thereto. The solution is moved into a Petri dish, and the acetone, THF, or MEK is evaporated. The Petri dish together with the residue therein is heated in a 70° C.

temperature-constant tank for 3 h. A film of the polymer after the heating is analyzed by infrared spectroscopy (IR) in the air atmosphere.

In the IR analysis results, the peak intensity at 1720 cm$^{-1}$, with the absorption coefficient at 3000 to 3030 cm$^{-1}$ being defined as 1.0, is defined as the absorption coefficient at 1720 cm$^{-1}$.

In order to firmly bond the fluororubber layer (A) and the fluororesin layer (B), the fluororubber (a1) is preferably a peroxide-vulcanizable fluororubber. The peroxide-vulcanizable fluororubber may be any fluororubber having a peroxide-vulcanizable portion.

Examples of methods of introducing the vulcanizable portion include a method of copolymerizing a monomer that can give a vulcanizable portion in polymerization of the fluororubber, and a method of using a compound that can give a vulcanizable portion, such as a bromine compound or an iodine compound, as a polymerization initiator or a chain-transfer agent.

Examples of the monomer that can give a vulcanizable portion include monomers usable for a VdF/CH$_2$=CFRf$^1$ copolymer to be mentioned later.

Examples of the bromine compound and the iodine compound include compounds usable for the VdF/CH$_2$=CFRf$^1$ copolymer to be mentioned later.

The fluororubber (a1) may have at least one of an iodine atom and a bromine atom, and the sum of the amounts thereof is preferably 0.001 to 10 wt %. The sum of the amounts of the iodine atom and the bromine atom is more preferably 0.01 to 5 wt %, still more preferably 0.1 to 5 wt %.

The iodine content can be determined as follows. First, 12 mg of a sample (fluororubber) is mixed with 5 mg of Na$_2$SO$_3$. Then, 30 mg of a mixture of Na$_2$CO$_3$ and K$_2$CO$_3$ at 1:1 (weight ratio) is dissolved in 20 ml of pure water to provide an absorption liquid. With this absorption liquid, the sample mixture is burnt in a quartz combustion flask in an oxygen atmosphere. The system is left to stand for 30 minutes, and then the iodine content is determined using an ion chromatograph 20A (Shimadzu Corp.). The calibration curve is obtained using a KI standard solution containing 0.5 ppm or 1.0 ppm of iodine ions.

Bonding sites of the iodine atom and the bromine atom each may be an end of the main chain or an end of a side chain of the fluororubber (a1), or may be both of them, of course. In such a fluororubber (a1), the iodine end or the bromine end serves as a vulcanization point (vulcanizable portion). This enables production of a vulcanized fluororubber having a high vulcanization density and peroxide vulcanization more easily.

In the fluororubber (a1), the amount of the monomer that can give a vulcanizable portion is preferably 0.01 to 10 mol %, more preferably 0.01 to 2 mol %, in all the monomer units.

The fluororubber (a1) is more preferably at least one selected from the group consisting of a vinylidene fluoride (VdF)/CH$_2$=CFRf$^1$ copolymer (wherein Rf$^1$ is a C1-C12 linear or branched fluoroalkyl group), a tetrafluoroethylene (TFE)/propylene copolymer, a TFE/propylene/VdF copolymer, an ethylene/TFE/perfluoro(alkyl vinyl ether):(PAVE) copolymer, a hexafluoropropylene (HFP)/TFE/ethylene copolymer, a VdF/HFP/TFE/PAVE/ethylene copolymer, an ethylene/HFP copolymer, a VdF/HFP copolymer, and a VdF/HFP/TFE copolymer.

The PAVE is preferably a monomer represented by CF$_2$=CF—ORf$^2$ wherein Rf$^2$ is a C1-C5 perfluoroalkyl group.

Examples of the PAVE include perfluoro(methyl vinyl ether), perfluoro(ethyl vinyl ether), perfluoro(propyl vinyl ether), and perfluoro(butyl vinyl ether). Perfluoro(methyl vinyl ether) is preferred.

For excellent bonding between the fluororubber layer (A) and the fluororesin layer (B), the fluororubber (a1) is more preferably at least one selected from the group consisting of a VdF/CH$_2$=CFRf$^1$ copolymer (wherein Rf$^1$ is a C1-C12 linear or branched fluoroalkyl group), a TFE/propylene copolymer, a TFE/propylene/VdF copolymer, a VdF/HFP/TFE copolymer, an ethylene/TFE/PAVE copolymer, a VdF/HFP copolymer, and a VdF/HFP/TFE/PAVE/ethylene copolymer; more preferably at least one selected from the group consisting of a VdF/CH$_2$=CFRf$^1$ copolymer (wherein Rf$^1$ is a C1-C12 linear or branched fluoroalkyl group), a TFE/propylene copolymer, a TFE/propylene/VdF copolymer, an ethylene/TFE/PAVE copolymer, a VdF/HFP/TFE/PAVE/ethylene copolymer, and a VdF/HFP copolymer; still more preferably at least one selected from the group consisting of a VdF/CH$_2$=CFRf$^1$ copolymer (wherein Rf$^1$ is a C1-C12 linear or branched fluoroalkyl group), a TFE/propylene copolymer, a TFE/propylene/VdF copolymer, an ethylene/TFE/PAVE copolymer, and a VdF/HFP/TFE/PAVE/ethylene copolymer; particularly preferably at least one selected from the group consisting of a VdF/CH$_2$=CFRf$^1$ copolymer (wherein Rf$^1$ is a C1-C12 linear or branched fluoroalkyl group), a TFE/propylene/VdF copolymer, and a TFE/propylene copolymer.

The fluororubber (a1) may include not only one of those mentioned above but also two or more thereof.

For excellent bonding between the fluororubber layer (A) and the fluororesin layer (B), the fluororubber (a1) is preferably a TFE/propylene copolymer.

In order to provide a laminate in which the fluororubber layer (A) and the fluororesin layer (B) are firmly bonded and which has excellently low fuel permeability and excellent fuel resistance, the fluororubber (a1) is also preferably a VdF/CH$_2$=CFRf$^1$ copolymer (wherein Rf$^1$ is a C1-C12 linear or branched fluoroalkyl group).

The fluororubber composition containing the fluororubber (a1) and a basic multifunctional compound wherein the fluororubber (a1) is a VdF/CH$_2$=CFRf$^1$ copolymer (wherein Rf$^1$ is a C1-C12 linear or branched fluoroalkyl group) is also one aspect of the present invention. In this case, the fluororubber composition preferably contains a peroxide vulcanizing agent.

For excellent bonding between the fluororubber layer (A) and the fluororesin layer (B), the VdF/CH$_2$=CFRf$^1$ copolymer (wherein Rf$^1$ is a C1-C12 linear or branched fluoroalkyl group) (hereinafter, also referred to simply as a "VdF/CH$_2$=CFRf$^1$ copolymer") preferably satisfies a ratio VdF/CH$_2$=CFRf$^1$ of 20/80 to 87/13 (mole ratio), more preferably 22/78 to 87/13 (mole ratio), still more preferably 70/30 to 86/14 (mole ratio), particularly preferably 74/26 to 83/17.

The VdF/CH$_2$=CFRf$^1$ copolymer is preferably a copolymer consisting only of VdF and a fluoromonomer represented by the following formula (1):

(wherein Rf$^1$ is a C1-C12 linear or branched fluoroalkyl group), or a copolymer consisting only of VdF, the fluoromonomer represented by the following formula (1):

(wherein Rf¹ is a C1-C12 linear or branched fluoroalkyl group), and a monomer copolymerizable with VdF and the fluoromonomer represented by the formula (1).

In this case, the VdF/CH$_2$=CFRf¹ copolymer is a copolymer consisting essentially of VdF and the fluoromonomer represented by the formula (1) or a copolymer consisting essentially of VdF, the fluoromonomer represented by the formula (1), and the copolymerizable monomer. These copolymers may be produced using a reactive emulsifier to the extent that the effects of the present invention are not impaired. The copolymers may have, for example, an I end derived from a chain-transfer agent.

More preferably, the VdF/CH$_2$=CFRf¹ copolymer is a copolymer consisting only of VdF and the fluoromonomer represented by the formula (1) and the mole ratio between the VdF unit and the unit derived from the fluoromonomer represented by the formula (1) is 80/20 to 20/80.

Also, preferably, the mole ratio between the VdF unit and the unit derived from the fluoromonomer represented by the formula (1) in the VdF/CH$_2$=CFRf¹ copolymer is 85/15 to 50/50 and the amount of the copolymerizable monomer unit is 1 to 50 mol % in all the monomer units.

The amounts of the respective monomer units are values determined by NMR.

The VdF/CH$_2$=CFRf¹ copolymer preferably has at least one of an iodine atom and a bromine atom, and the sum of the amounts thereof is preferably 0.001 to 10 wt %. The sum of the amounts of the iodine atom and the bromine atom is more preferably 0.01 to 5 wt %, still more preferably 0.1 to 5 wt %.

The iodine content can be determined as follows. First, 12 mg of a sample (fluororubber) is mixed with 5 mg of Na$_2$SO$_3$. Then, 30 mg of a mixture of Na$_2$CO$_3$ and K$_2$CO$_3$ at 1:1 (weight ratio) dissolved in 20 ml of pure water to provide an absorption liquid. With this absorption liquid, the sample mixture is burnt in a quartz combustion flask in an oxygen atmosphere. The system is left to stand for 30 minutes, and then the iodine content is determined using an ion chromatograph 20A (Shimadzu Corp.). The calibration curve is obtained using a KI standard solution containing 0.5 ppm or 1.0 ppm of iodine ions.

Bonding sites of the iodine atom and the bromine atom each may be an end of the main chain or an end of a side chain of the fluororubber, or may be both of them, of course. In such a fluororubber, the iodine end or the bromine end serves as a vulcanization point (vulcanizable portion). This enables production of a vulcanized fluororubber having a high vulcanization density and peroxide vulcanization more easily.

The VdF/CH$_2$=CFRf¹ copolymer can be produced using, for example, an iodine- or bromine-containing monomer as a monomer that can give a vulcanizable portion, or a bromine compound or an iodine compound as a polymerization initiator or a chain-transfer agent.

In the VdF/CH$_2$=CFRf¹ copolymer, the fluoromonomer represented by the formula (1) is preferably a monomer in which Rf¹ is a linear fluoroalkyl group, more preferably a monomer in which Rf¹ is a linear perfluoroalkyl group. The carbon number of Rf¹ is preferably 1 to 6.

Examples of the fluoromonomer represented by the formula (1) include CH$_2$=CFCF$_3$, CH$_2$=CFCF$_2$CF$_3$, CH$_2$=CFCF$_2$CF$_2$CF$_3$, and CH$_2$=CFCF$_2$CF$_2$CF$_2$CF$_3$, and 2,3,3,3-tetrafluoropropene represented by CH$_2$=CFCF$_3$ is preferred.

In the VdF/CH$_2$=CFRf¹ copolymer, the copolymerizable monomer may be any monomer (excluding a monomer that can give a vulcanizable portion) that is copolymerizable with vinylidene fluoride and the fluoromonomer represented by the formula (1), and one monomer or two or more monomers may be used.

The copolymerizable monomer is preferably at least one selected from the group consisting of tetrafluoroethylene (TFE), hexafluoropropylene, perfluoro(methyl vinyl ether), perfluoro(ethyl vinyl ether), perfluoro(propyl vinyl ether), chlorotrifluoroethylene, trifluoroethylene, hexafluoroisobutene, vinyl fluoride, ethylene, propylene, and alkyl vinyl ethers. The amount of the copolymerizable monomer in the VdF/CH$_2$=CFRf¹ copolymer is preferably 0 to 50 mol %, more preferably 1 to 50 mol %, in all the monomer units.

In the VdF/CH$_2$=CFRf¹ copolymer, the monomer that can give a vulcanizable portion may be, for example, an iodine- or bromine-containing monomer represented by the following formula:

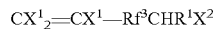
$$CX^1_2=CX^1—Rf^3CHR^1X^2$$

(wherein X¹ is a hydrogen atom, a fluorine atom, or —CH$_3$; Rf³ is a fluoroalkylene group, a perfluoroalkylene group, a fluoro(poly)oxyalkylene group, or a perfluoro(poly)oxyalkylene group; R¹ is a hydrogen atom or —CH$_3$; X² is an iodine atom or a bromine atom); an iodine- or bromine-containing monomer represented by the following formula:

$$CX^1_2=CX^1—Rf^3X^2$$

(wherein X¹ is a hydrogen atom, a fluorine atom, or —CH$_3$; Rf³ is a fluoroalkylene group, a perfluoroalkylene group, a fluoro(poly)oxyalkylene group, or a perfluoro(poly)oxyalkylene group; X² is an iodine atom or a bromine atom) (preferably, an iodine-containing monomer represented by the formula: CH$_2$=CH(CF$_2$)$_n$I (where n is an integer of 2 to 8); a monomer represented by the following formula:

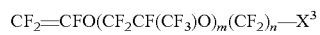
$$CF_2=CFO(CF_2CF(CF_3)O)_m(CF_2)_n—X^3$$

(wherein m is an integer of 0 to 5; n is an integer of 1 to 3; X³ is a cyano group, a carboxyl group, an alkoxy carbonyl group, an iodine atom, or a bromine atom); a monomer represented by the following formula:

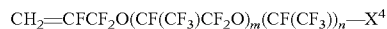
$$CH_2=CFCF_2O(CF(CF_3)CF_2O)_m(CF(CF_3))_n—X^4$$

(wherein m is an integer of 0 to 5; n is an integer of 1 to 3; X⁴ is a cyano group, a carboxyl group, an alkoxy carbonyl group, an iodine atom, a bromine atom, or —CH$_2$OH); and a monomer represented by the following formula:

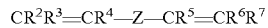
$$CR^2R^3=CR^4—Z—CR^5=CR^6R^7$$

(wherein R², R³, R⁴, R⁵, R⁶, and R⁷ may be the same as or different from each other, and are each a hydrogen atom or a C1-C5 alkyl group; Z is a C1-C18 alkylene group, a C3-C18 cyclo alkylene group, a C1-C10 at least partially fluorinated alkylene or oxyalkylene group, or a (per) fluoropolyoxyalkylene group represented by the following formula:

$$-(Q)_p-CF_2O—(CF_2CF_2O)_m(CF_2O)_n—CF_2-(Q)_p-$$

(wherein Q is an alkylene or oxyalkylene group; p is 0 or 1; m/n is 0.2 to 5) and having a molecular weight of 500 to 10000), each of which is linear or branched and may have an oxygen atom).

Examples of the compound represented by the formula: CR²R³=CR⁴—Z—CR⁵=CR⁶R⁷ include CH$_2$=CH—(CF$_2$)$_2$—CH=CH$_2$, CH$_2$=CH—(CF$_2$)$_4$—CH=CH$_2$, CH$_2$=CH—(CF$_2$)$_6$—CH=CH$_2$, and monomers represented by the following formula:

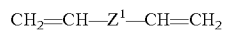
$$CH_2=CH—Z^1—CH=CH_2$$

wherein $Z^1$ is a fluoropolyoxyalkylene group represented by —$CH_2OCH_2$—$CF_2O$—$(CF_2CF_2O)_{m1}(CF_2O)_{n1}$—$CF_2$—$CH_2OCH_2$— (where m1/n1 is 0.5) and having a molecular weight of 2000.

In one preferred embodiment, the monomer that can give a vulcanizable portion is at least one selected from the group consisting of $CF_2$=$CFOCF_2CF(CF_3)OCF_2CF_2CN$, $CF_2$=$CFOCF_2CF(CF_3)OCF_2CF_2COOH$, $CF_2$=$CFOCF_2CF(CF_3)OCF_2CF_2CH_2I$, $CF_2$=$CFOCF_2CF_2CH_2I$, $CH_2$=$CFCF_2OCF(CF_3)CF_2OCF(CF_3)CN$, $CH_2$=$CFCF_2OCF(CF_3)CF_2OCF(CF_3)COOH$, $CH_2$=$CFCF_2OCF(CF_3)CF_2OCF(CF_3)CH_2OH$, $CH_2$=$CHCF_2CF_2I$, and $CH_2$=$CH(CF_2)_2CH$=$CH_2$.

In order to improve the vulcanization density and to give a good compression set in peroxide vulcanization, the monomer that can give a vulcanizable portion is particularly preferably $CF_2$=$CFOCF_2CF_2CH_2I$.

In another preferred embodiment, the monomer that can give a vulcanizable portion is at least one monomer selected from the group consisting of iodine- or bromine-containing monomers represented by the following formula:

$$CX^1_2=CX^1-Rf^3CHR^1X^2$$

(wherein $X^1$ is a hydrogen atom, a fluorine atom, or —$CH_3$; $Rf^3$ is a fluoroalkylene group, a perfluoroalkylene group, a fluoropolyoxyalkylene group, or a perfluoropolyoxyalkylene group; $R^1$ is a hydrogen atom or —$CH_3$; $X^2$ is an iodine atom or a bromine atom); iodine- or bromine-containing monomers represented by the following formula:

$$CX^1_2=CX^1-Rf^3X^2$$

(wherein $X^1$ is a hydrogen atom, a fluorine atom, or —$CH_3$; $Rf^3$ is a fluoroalkylene group, a perfluoroalkylene group, a fluoropolyoxyalkylene group, or a perfluoropolyoxyalkylene group; $X^2$ is an iodine atom or a bromine atom) (preferably, iodine-containing monomers represented by $CH_2$=$CH(CF_2)_nI$ (where n is an integer of 2 to 8)); monomers represented by the following formula:

$$CF_2=CFO(CF_2CF(CF_3)O)_m(CF_2)_n-X^5$$

(wherein m is an integer of 0 to 5; n is an integer of 1 to 3; $X^5$ is an iodine atom or a bromine atom); and monomers represented by the following formula:

$$CH_2=CFCF_2O(CF(CF_3)CF_2O)_m(CF(CF_3))_n-X^5$$

(wherein m is an integer of 0 to 5; n is an integer of 1 to 3; $X^5$ is an iodine atom or a bromine atom).

Use of such an iodine- or bromine-containing monomer as the copolymerizable monomer also enables production of the VdF/$CH_2$=$CFRf^1$ copolymer.

The amount of the monomer that can give a vulcanizable portion is preferably 0.01 to 10 mol %, more preferably 0.01 to 2 mol %, in all the monomer units.

The vulcanizable portion can also be introduced using a bromine compound or an iodine compound as a chain-transfer agent.

The VdF/$CH_2$=$CFRf^1$ copolymer is preferably produced using a bromine compound or an iodine compound as a chain-transfer agent. One example of a polymerization method using a bromine compound or an iodine compound is emulsion polymerization in an aqueous medium under pressure in the presence of a bromine compound or an iodine compound and substantially in the absence of oxygen (iodine transfer polymerization). Representative examples of the bromine compound or iodine compound to be used include compounds represented by the following formula:

$$R^2I_xBr_y$$

wherein x and y are each an integer of 0 to 2, and satisfy 1≤x+y≤2; $R^2$ is a C1-C16 saturated or unsaturated fluorohydrocarbon group or chlorofluorohydrocarbon group, or a C1-C3 hydrocarbon group, each of which may optionally have an oxygen atom). Use of a bromine compound or an iodine compound leads to introduction of iodine or bromine into the polymer, and the element serves as a vulcanization point.

Examples of the iodine compound include 1,3-diiodoperfluoropropane, 2-iodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1, and monoiodomonobromo substitution products, diiodomonobromo substitution products, and (2-iodoethyl) and (2-bromoethyl) substitution products of benzene. These compounds may be used alone or in any combination thereof.

For good polymerization reactivity, vulcanization reactivity, easy availability, and other properties, 1,4-diiodoperfluorobutane, 1,6-diiodoperfluorohexane, or 2-iodoperfluoropropane is preferred.

For excellent bonding between the fluororubber layer (A) and the fluororesin layer (B), the TFE/propylene copolymer preferably has a ratio TFE/propylene of (45 to 70)/(55 to 30) (mole ratio). In addition to these two components, the copolymer may further include a specific third component (e.g., PAVE) in an amount of 0 to 40 mol % based on 100 mol % of the sum of the TFE unit and the propylene unit.

For excellent bonding between the fluororubber layer (A) and the fluororesin layer (B), the ethylene/TFE/PAVE copolymer preferably has a ratio ethylene/TFE/PAVE of (10 to 40)/(32 to 60)/(20 to 40) (mole ratio), more preferably (20 to 40)/(32 to 60)/(20 to 35) (mole ratio).

In the ethylene/TFE/PAVE copolymer, the PAVE is more preferably perfluoro(methyl vinyl ether) (PMVE).

The copolymer may include a monomer that can give a vulcanizable portion (cure-site monomer).

For excellent bonding between the fluororubber layer (A) and the fluororesin layer (B), the VdF/HFP/TFE/PAVE/ethylene copolymer preferably has a ratio VdF/HFP/TFE/PAVE/ethylene of (20 to 60)/(15 to 55)/(0 to 15)/(5 to 25)/(0 to 25) (mole ratio), more preferably (30 to 50)/(25 to 45)/(5 to 10)/(10 to 20)/(0.5 to 15) (mole ratio).

For excellent bonding between the fluororubber layer (A) and the fluororesin layer (B), the VdF/HFP/TFE copolymer preferably has a ratio VdF/HFP/TFE of (30 to 80)/(10 to 35)/(4 to 35) (mole ratio).

For excellent bonding between the fluororubber layer (A) and the fluororesin layer (B), the VdF/HFP copolymer preferably has a ratio VdF/HFP of (70 to 85)/(15 to 30) (mole ratio), more preferably (75 to 80)/(20 to 25) (mole ratio).

The ethylene/TFE/PAVE copolymer, the VdF/HFP/TFE/PAVE/ethylene copolymer, the VdF/HFP copolymer, the TFE/propylene copolymer, the TFE/propylene/VdF copolymer, the HFP/TFE/ethylene copolymer, the HFP/ethylene copolymer, and the VdF/HFP/TFE copolymer each may include a polymerized unit based on an additional monomer. The additional monomer may be at least one monomer selected from the group consisting of tetrafluoroethylene, hexafluoropropylene, perfluoro(methyl vinyl ether), perfluoro(ethyl vinyl ether), perfluoro(propyl vinyl ether), chlorotrifluoroethylene, trifluoroethylene, hexafluoroisobutene, vinyl fluoride, ethylene, propylene, alkyl vinyl ethers, and a monomer that can give a vulcanizable portion. The monomer that can give a vulcanizable portion may be any appropriate one of those mentioned above.

The amount of the polymerized unit based on the additional monomer is preferably 0 to 20 mol %, more preferably 0.01 to 10 mol %, in all the polymerized units.

The fluororubber (a1) preferably has a fluorine content of 60 mass % or more. The upper limit of the fluorine content may be any value, and is preferably 74 mass % or less. The fluorine content can be calculated based on the composition of the fluororubber (a1).

The fluororubber (a1) preferably has a Mooney viscosity ($ML_{(1+10)}$ (121° C.)) of 2 to 200, more preferably 5 to 100.

The Mooney viscosity is a value determined in conformity with ASTM-D1646 and JIS K6300.

The fluororubber (a1) preferably has a number average molecular weight (Mn) of 5000 to 500000, more preferably 10000 to 500000.

The number average molecular weight is a value determined by GPC.

The rubber component of the fluororubber composition preferably consists only of the fluororubber (a1).

The fluororubber composition contains a basic multifunctional compound having at least two nitrogen atoms in the molecule with a distance between the nitrogen atoms in the molecule of 5.70 Å or greater. Containing the basic multifunctional compound enables firm bonding between the fluororubber layer (A) and the fluororesin layer (B) even when the fluororesin (b1) constituting the fluororesin layer (B) has excellently low fuel permeability.

The basic multifunctional compound is a compound that has two or more functional groups having the same structure or different structures in the molecule and that shows basicity.

The functional groups in the basic multifunctional compound are preferably those showing basicity, and each of them is preferably at least one selected from the group consisting of $-NH_2$, $-NH_3^+$, $-NHCOOH$, $-NHCOO^-$, $-N=CR^1R^2$ (wherein $R^1$ and $R^2$ are each individually a C0-C12 organic group), $-NR^3R^4$ (wherein $R^3$ and $R^4$ are each individually a C0-C12 organic group), $-NR^3R^4R^5$ (wherein $R^3$, $R^4$ and $R^5$ are each individually a C0-C12 organic group), and functional groups that are to be converted into any of the aforementioned functional groups by heating; more preferably at least one selected from the group consisting of $-NH_2$, $-NH_3^+$, $-N=CR^1R^2$ (wherein $R^1$ and $R^2$ are defined in the same manner as mentioned above), and $NR^3R^4R^5$ (wherein $R^3$, $R^4$, and $R^5$ are defined in the same manner as mentioned above); still more preferably at least one selected from the group consisting of $-NH_2$, $-NH_3^+$, and $-N=CR^1R^2$ (wherein $R^1$ and $R^2$ are defined in the same manner as mentioned above).

$R^1$, $R^2$, $R^3$, $R^4$, and $R^5$ are preferably each individually $-H$ or a C1-C12 organic group, preferably $-H$ or a C1-C12 hydrocarbon group. The hydrocarbon group may have one or two or more carbon-carbon double bonds. The carbon number of the hydrocarbon group is preferably 1 to 8.

Preferably, $R^1$ is $-H$ or $-CH_3$ and $R^2$ is $-CH=CHR^6$ (wherein $R^6$ is a phenyl group ($-C_6H_5$), a benzyl group ($-CH_2-C_6H_5$), or $-H$). More preferably, $R^1$ is $-H$ and $R^2$ is $-CH=CH-C_6H_5$.

Examples of the basic multifunctional compound include ethylenediamine, propanediamine, putrescine, cadaverine, hexamethylenediamine, heptanediamine, octanediamine, nonanediamine, decanediamine, undecanediamine, dodecanediamine, phenylenediamine, N,N'-dicinnamylidene-1,6-hexamethylenediamine, N,N,N',N'-tetramethyl-1,6-hexamethylenediamine, N,N'-dimethyl-1,6-hexamethylenediamine, and 6-aminohexyl carbamic acid.

The basic multifunctional compound has at least two nitrogen atoms in the molecule and the distance between the nitrogen atoms is 5.70 Å or greater. The distance between the nitrogen atoms is more preferably 6.30 Å or greater, still more preferably 7.60 Å or greater, particularly preferably 8.60 Å or greater. The basic multifunctional compound having a great distance between the nitrogen atoms has increased flexibility and is easily vulcanized.

The distance between the nitrogen atoms is calculated by the following method. Specifically, the structural optimization of each base is calculated by the density functional method (program: Gaussian 03, density function: B3LYP, basic function: 6-31G*).

For excellent bonding between the fluororubber layer (A) and the fluororesin layer (B), the basic multifunctional compound is preferably at least one selected from the group consisting of N,N'-dicinnamylidene-1,6-hexamethylenediamine and $NH_2(CH_2)_n-NH_2$ (wherein n is 5 to 12), more preferably at least one compound selected from the group consisting of hexamethylenediamine and N,N'-dicinnamylidene-1,6-hexamethylenediamine.

For firmer bonding between the fluororubber layer (A) and the fluororesin layer (B), the amount of the basic multifunctional compound in the fluororubber composition is preferably 0.5 parts by mass or more, more preferably 0.6 parts by mass or more, still more preferably 0.8 parts by mass or more, particularly preferably 1 part by mass or more, for 100 parts by mass of the fluororubber (a1).

From the viewpoint of vulcanization inhibition and cost, the amount of the basic multifunctional compound is preferably 10 parts by mass or less, particularly preferably 6 parts by mass or less.

The fluororubber composition may further contain at least one compound (a2) selected from the group consisting of a 1,8-diazabicyclo(5.4.0)undecene-7 salt (DBU salt), a 1,5-diazabicyclo(4.3.0)-nonene-5 salt (DBN salt), 1,8-diazabicyclo(5.4.0)undecene-7 DBU), 1,5-diazabicyclo(4.3.0)-nonene-5 (DBN), and melamine.

Combination use of the basic multifunctional compound and the compound (a2) enables firm bonding between the fluororubber layer (A) and the fluororesin layer (B) even if the amount of the basic multifunctional compound is small.

The DBU salt and the DBN salt each may be a carbonate, a long-chain aliphatic carboxylate, an aromatic carboxylate, an orthophthalate, a p-toluenesulfonate, a phenoxide, a phenol resin salt, a naphthoate, an octylate, an oleate, a formate, a phenol novolak resin salt, or a hydrochloride of DBU or DBN. Each of them is preferably at least one compound selected from the group consisting of a naphthoate, orthophthalates, phenoxides, and a formate of DBU or DBN, and 8-benzyl-1,8-diazabicyclo(5.4.0)-7-undecenium chloride (DBU-B); more preferably at least one compound selected from the group consisting of 1,8-diazabicyclo(5.4.0)undecene-7, 1,5-diazabicyclo(4.3.0)nonene-5, 8-benzyl-1,8-diazabicyclo(5.4.0)-7-undecenium chloride, a naphthoate of 1,8-diazabicyclo(5.4.0)undecene-7, a phenoxide of 1,8-diazabicyclo(5.4.0)undecene-7, an orthophthalate of 1,8-diazabicyclo(5.4.0)undecene-7, and a formate of 1,8-diazabicyclo(5.4.0)undecene-7.

At least one selected from the group consisting of 8-benzyl-1,8-diazabicyclo(5.4.0)-7-undecenium chloride and a formate of 1,8-diazabicyclo(5.4.0)undecene-7 is particularly preferred.

The compound (a2) may include two or more of these compounds in combination.

The amount of the compound (a2) is preferably 0.5 parts by mass or more for 100 parts by mass of the fluororubber (a1). The amount thereof is more preferably 1.0 part by mass or more. Too small an amount of the compound (a2) may fail to give sufficient bonding force.

The amount of the compound (a2) is preferably 5 parts by mass or less, more preferably 4 parts by mass or less, still more preferably 3.5 parts by mass or less, for 100 parts by mass of the fluororubber (a1).

The fluororubber composition preferably further contains a vulcanizing agent. The vulcanizing agent can be selected in accordance with the purpose thereof, and may be a peroxide vulcanizing agent.

The peroxide vulcanizing agent may be any agent, and may be an organic peroxide. The organic peroxide is preferably one easily generating peroxy radicals in the presence of heat or a redox system. Examples thereof include 1,1-bis(t-butylperoxy)-3,5,5-trimethylcyclohexane, 2,5-dimethylhexane-2,5-dihydroxyperoxide, di-t-butyl peroxide, t-butyl cumyl peroxide, dicumyl peroxide, α,α'-bis(t-butylperoxy)-p-diisopropylbenzene, 2,5-dimethyl-2,5-di(t-butylperoxy)hexane, 2,5-dimethyl-2,5-di(t-butylperoxy)hexyne-3, benzoyl peroxide, t-butylperoxybenzene, 2,5-dimethyl-2,5-di(benzoylperoxy)hexane, t-butylperoxy maleic acid, and t-butylperoxy isopropyl carbonate. More preferred are dialkyl compounds.

The amount thereof is usually selected as appropriate in accordance with the amount of active —O—O—, the decomposition temperature, and others. The amount thereof is usually 0.1 to 15 parts by mass, preferably 0.3 to 5 parts by mass, for 100 parts by mass of the fluororubber (a1).

The organic peroxide used as a vulcanizing agent may be combined with a vulcanization aid or a co-vulcanizing agent. The vulcanization aid or the co-vulcanizing agent may be any agent, such as the aforementioned vulcanization aids and co-vulcanizing agents. For good vulcanizability and good physical properties of a vulcanizate, triallyl isocyanurate (TAIC) is preferred.

The amount of the vulcanization aid and/or the co-vulcanizing agent is preferably 0.2 to 10 parts by mass, more preferably 0.3 to 6 parts by mass, still more preferably 0.5 to 5 parts by mass, for 100 parts by mass of the fluororubber. Less than 0.2 parts by mass of the vulcanizing agent and/or the co-vulcanizing agent tends to cause a low vulcanization density and a large compression set. More than 10 parts by mass thereof tends to cause too high a vulcanization density, so that the vulcanizate tends to be easily cracked in compression.

The fluororubber composition may contain, as an acid acceptor or a compounding agent for improving the bonding between the fluororubber layer (A) and the fluororesin layer (B), at least one compound selected from the group consisting of metal oxides, metal hydroxides, weak acid salts of alkali metals, and weak acid salts of alkaline earth metals.

Examples of the metal oxides, metal hydroxides, weak acid salts of alkali metals, and weak acid salts of alkaline earth metals include oxides, hydroxides, carbonates, carboxylates, silicates, borates, and phosphates of metals in the group II of the Periodic table, and oxides, basic carbonates, basic carboxylates, basic phosphites, and basic sulfites of metals in the group IV of the Periodic table.

Specific examples of the metal oxides, metal hydroxides, weak acid salts of alkali metals, and weak acid salts of alkaline earth metals include magnesium oxide, zinc oxide, magnesium hydroxide, barium hydroxide, magnesium carbonate, barium carbonate, calcium oxide (quicklime), calcium hydroxide (slaked lime), calcium carbonate, calcium silicate, calcium stearate, zinc stearate, calcium phthalate, calcium phosphite, tin oxide, and basic tin phosphite.

In the case of using an organic peroxide as a vulcanizing agent, the amount of the metal oxides, metal hydroxides, weak acid salts of alkali metals, and weak acid salts of alkaline earth metals is preferably 5 parts by mass or less, more preferably 3 parts by mass or less. For good acid resistance, containing no such substances is still more preferred.

The fluororubber composition may contain any additives usually blended into the fluororubber composition, if necessary. Examples thereof include fillers, processing aids, plasticizers, colorants, stabilizers, adhesive aids, acid acceptors, release agents, conductivity-imparting agents, thermal-conductivity-imparting agents, surface non-adhesive agents, flexibility-imparting agents, heat resistance improvers, and flame retarders. Further, the fluororubber composition may contain one or more of usual vulcanizing agents and vulcanization accelerators other than those mentioned above.

Examples of the fillers include carbon black. The amount of the carbon black is preferably 5 to 40 parts by mass, more preferably 10 to 30 parts by mass, for 100 parts by mass of the fluororubber (a1). Use of the carbon black advantageously improves properties such as mechanical properties and heat resistance.

The fluororubber composition can be obtained by kneading the fluororubber (a1) and the basic multifunctional compound, and if necessary the compound (a2) and any other additives such as a vulcanizing agent, a vulcanization aid, a co-vulcanizing agent, a vulcanization accelerator, and a filler, using a commonly used rubber kneading device. The rubber-kneading device may be a roll, a kneader, a Banbury mixer, an internal mixer, a twin-screw extruder, or the like.

(B) Fluororesin Layer

The fluororesin layer (B) is formed from a fluororesin (b1), and the fluororesin (b1) has a fuel permeability coefficient of 2.0 g·mm/m$^2$/day or lower.

The fluororesin (b1) having a fuel permeability coefficient of 2.0 g·mm/m$^2$/day or lower leads to excellently low fuel permeability. Thus, the laminate of the present invention can be suitably used as a fuel hose, for example.

The fuel permeability coefficient is preferably 1.5 g·mm/m$^2$/day or lower, more preferably 0.8 g·mm/m$^2$/day or lower, still more preferably 0.55 g·mm/m$^2$/day or lower, particularly preferably 0.5 g·mm/m$^2$/day or lower.

The fuel permeability coefficient is a value calculated from the mass change determined as follows: 18 mL of a solvent mixture of isooctane, toluene, and ethanol at a volume ratio isooctane/toluene/ethanol of 45:45:10 is put into a SUS316 cup for fuel permeability coefficient measurement (inner diameter: 40 mmφ, height: 20 mm), and a fluororesin sheet (diameter: 45 mm, thickness 120 μm) produced from the target resin by the following method is assembled therewith, and the mass change is determined at 60° C.

(Method of Producing Fluororesin Sheet)

Resin pellets are put into a mold having a diameter of 120 mm. The workpiece is mounted on a press heated up to 300° C., and melt-pressed at a pressure of about 2.9 MPa. Thereby, a fluororesin sheet having a thickness of 0.12 mm was obtained. This sheet is processed to have a diameter of 45 mm and a thickness of 120 μm.

In order to provide a laminate having excellently low fuel permeability, the fluororesin (b1) is preferably at least one selected from the group consisting of polychlorotrifluoroethylene (PCTFE), a CTFE-containing copolymer, and a TFE/HFP/VdF copolymer. For good flexibility, at least one selected from the group consisting of a CTFE-containing copolymer and a TFE/HFP/VdF copolymer is more preferred. For low fuel permeability, a CTFE-containing copolymer is still more preferred.

A low VdF content leads to excellently low fuel permeability, the TFE/HFP/VdF copolymer preferably has a copolymerization ratio (mol % ratio) of TFE/HFP/VdF=(75 to 95)/(0.1 to 10)/(0.1 to 19), more preferably (77 to 95)/(1 to 8)/(1 to 17) (mole ratio), still more preferably (77 to 95)/(2 to 8)/(2 to 15.5) (mole ratio), most preferably (79 to 90)/(5 to 8)/(5 to 15) (mole ratio). The TFE/HFP/VdF copolymer may further contain 0 to 20 mol % of an additional monomer. The additional monomer may be at least one monomer selected from the group consisting of fluorine-containing monomers such as tetrafluoroethylene, hexafluoropropylene, perfluoro(methyl vinyl ether), perfluoro(ethyl vinyl ether), perfluoro(propyl vinyl ether), chlorotrifluoroethylene, 2-chloropentafluoropropene, and perfluorinated vinyl ethers (e.g., perfluoroalkoxy vinyl ethers such as $CF_3OCF_2CF_2CF_2OCF=CF_2$), perfluoroalkyl vinyl ethers, perfluoro-1,3-butadiene, trifluoroethylene, hexafluoroisobutene, vinyl fluoride, ethylene, propylene, and alkyl vinyl ethers. Preferred are perfluoro(methyl vinyl ether), perfluoro(ethyl vinyl ether), and perfluoro(propyl vinyl ether).

The PCTFE is a homopolymer of chlorotrifluoroethylene.

The CTFE-containing copolymer preferably contains a copolymerized unit (CTFE unit) derived from CTFE and a copolymerized unit derived from at least one monomer selected from the group consisting of TFE, HFP, PAVE, VdF, vinyl fluoride, hexafluoroisobutene, monomers represented by the following formula:

$$CH_2=CX^1)CF_2)_nX^2$$

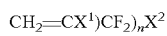

(wherein $X^1$ is H or F; $X^2$ is H, F, or Cl; n is an integer of 1 to 10), ethylene, propylene, 1-butene, 2-butene, vinyl chloride, and vinylidene chloride.

The CTFE-containing copolymer is more preferably a perhalo polymer.

The CTFE-containing copolymer more preferably includes a CTFE unit and a copolymerized unit derived from at least one monomer selected from the group consisting of TFE, HFP, and PAVE, still more preferably consisting essentially of these copolymerized units. For low fuel permeability, the CTFE-containing copolymer is preferably free from a monomer having a CH bond, such as ethylene, vinylidene fluoride, and vinyl fluoride.

A perhalo polymer free from a monomer having a CH bond is usually difficult to bond to fluororubber. Still, the configuration of the present invention enables firm interlayer bonding between the fluororesin layer (B) and the fluororubber layer (A) even if the fluororesin layer (B) is a layer formed from a perhalo polymer.

The CTFE-containing copolymer preferably includes 10 to 90 mol % of the CTFE unit in all the monomer units.

The CTFE-containing copolymer particularly preferably includes a CTFE unit, a TFE unit, and a monomer (α) unit derived from a monomer (α) copolymerizable therewith.

The "CTFE unit" and the "TFE unit" are respectively a portion (—CFCl—$CF_2$—) derived from CTFE and a portion (—$CF_2$—$CF_2$—) derived from TFE in the molecular structure of the CTFE-containing copolymer, and the "monomer (α) unit" is also a portion formed by addition of the monomer (α) in the molecular structure of the CTFE-containing copolymer.

The monomer (α) may be any monomer copolymerizable with CTFE and TFE. Examples thereof include ethylene (Et), vinylidene fluoride (VdF), PAVE represented by $CF_2=CF—ORf^1$ (wherein $Rf^1$ is a C1-C8 perfluoroalkyl group), vinyl monomers represented by $CX^3X^4=CX^5(CF_2)_nX^6$ (wherein $X^3$, $X^4$, and $X^5$ may be the same as or different from each other, and are each a hydrogen atom or a fluorine atom; $X^6$ is a hydrogen atom, a fluorine atom, or a chlorine atom; n is an integer of 1 to 10), and alkyl perfluorovinyl ether derivatives represented by $CF_2=CF—O—Rf^2$ (wherein $Rf^2$ is a C1-C5 perfluoroalkyl group).

The alkyl perfluorovinyl ether derivatives are preferably those in which $Rf^2$ is a C1-C3 perfluoroalkyl group, more preferably $CF_2=CF—OCF_2—CF_2CF_3$.

The monomer (α) is preferably at least one selected from the group consisting of PAVE, the vinyl monomers, and alkyl perfluorovinyl ether derivatives, more preferably at least one selected from the group consisting of PAVE and HFP, particularly preferably PAVE.

The proportions of the CTFE unit and the TFE unit in the CTFE-containing copolymer are respectively 15 to 90 mol % and 85 to 10 mol %, more preferably 20 to 90 mol % and 80 to 10 mol %. The composition with a CTFE unit proportion of 15 to 25 mol % and a TFE unit proportion of 85 to 75 mol % is also preferred.

Preferably, in the CTFE-containing copolymer, the sum of the amounts of the CTFE unit and the TFE unit is 90 to 99.9 mol % and the amount of the monomer (α) unit is 0.1 to 10 mol %. Less than 0.1 mol % of the monomer (α) unit may cause poor moldability, environmental stress-crack resistance, and fuel crack resistance. More than 10 mol % thereof tends to cause poor fuel permeability, heat resistance, and mechanical properties.

For low fuel permeability and good bonding, the fluororesin (b1) is more preferably at least one selected from the group consisting of PCTFE, a CTFE/TFE/PAVE copolymer, and a TFE/HFP/VdF copolymer, still more preferably at least one selected from the group consisting of a CTFE/TFE/PAVE copolymer and a TFE/HFP/VdF copolymer, particularly preferably a CTFE/TFE/PAVE copolymer.

The CTFE/TFE/PAVE copolymer is a copolymer consisting essentially of CTFE, TFE, and PAVE.

Examples of the PAVE in the CTFE/TFE/PAVE copolymer include perfluoro(methyl vinyl ether) (PMVE), perfluoro(ethyl vinyl ether) (PEVE), perfluoro(propyl vinyl ether) (PPVE), and perfluoro(butyl vinyl ether). The PAVE is preferably at least one selected from the group consisting of PMVE, PEVE, and PPVE.

The amount of the PAVE unit in the CTFE/TFE/PAVE copolymer is preferably 0.5 mol % or more and 5 mol % or less in all the monomer units.

The constitutional units such as the CTFE unit are values determined by $^{19}$F-NMR analysis.

The fluororesin (b1) may have at least one reactive functional group selected from the group consisting of a carbonyl group, a hydroxyl group, a heterocyclic group, and an amino group at a main chain end and/or a side chain of the polymer.

The term "carbonyl group" herein means a carbon divalent group that is constituted by a carbon-oxygen double bond and is typified by —C(=O)—. The reactive functional group having the carbonyl group may be any group, and examples thereof include those having a carbonyl group as part of the chemical structure, such as a carbonate group, a carboxylic halide group (halogenoformyl group), a formyl group, a carboxyl group, an ester bond (—C(=O)O—), an acid anhydride bond (—C(=O)O—C(=O)—), an isocyanate group, an amide group, an imide group (—C(=O)—NH—C(=O)—), a urethane bond (—NH—C(=O)—O—), a carbamoyl group (NH$_2$—C(=O)—), a carbamoyloxy group (NH$_2$—C(=O)O—), a ureido group (NH$_2$—C(=O)—NH—), and an oxamoyl group (NH$_2$—C(=O)—C(=O)—).

The hydrogen atom(s) coupled with the nitrogen atom(s) in the amide group, the imide group, the urethane bond, the carbamoyl group, the carbamoyloxy group, the ureido group, the oxamoyl group, and others may be replaced by a hydrocarbon group such as an alkyl group.

For easy introduction of the group and for appropriate heat resistance and good adhesiveness at relatively low temperature of the fluororesin (b1), the reactive functional group is preferably an amide group, a carbamoyl group, a hydroxyl group, a carboxyl group, a carbonate group, a carboxylic halide group, or an acid anhydride bond, more preferably an amide group, a carbamoyl group, a hydroxyl group, a carbonate group, a carboxylic halide group, or an acid anhydride bond.

The fluororesin (b1) can be produced by any conventionally known polymerization method such as suspension polymerization, solution polymerization, emulsion polymerization, or bulk polymerization. The polymerization conditions such as temperature and pressure and whether a polymerization initiator and other additives are used or not can be appropriately adjusted in accordance with the composition and the amount of the fluororesin (b1).

The fluororesin (b1) may have any melting point, and the melting point is preferably 160° C. to 270° C. The melting point of the fluororesin (b1) is determined as a temperature corresponding to the maximum value on the heat-of-fusion curve obtained by heating the resin at a rate of 10° C./min using a DSC device (Seiko Instruments Inc.).

The fluororesin (b1) preferably has a molecular weight within a range that enables the resulting laminate to exert good mechanical properties and low fuel permeability. In the case of using the melt flow rate (MFR) as the standard of the molecular weight, for example, the MFR at a temperature within the range of about 230° C. to 350° C., which is a usual molding temperature range for fluororesin, is preferably 0.5 to 100 g/10 min. The MFR is more preferably 1 to 50 g/10 min, still more preferably 2 to 35 g/10 min. For example, the MFR of the fluororesin (b1) that is PCTFE, a CTFE-containing copolymer, or a TFE/HFP/VdF copolymer is determined at 297° C.

The MFR can be determined as follows. Specifically, the weight (g) of the polymer flowed out of a nozzle (diameter: 2 mm, length: 8 mm) per unit time (10 minutes) is determined at 297° C. and 5 kg load using a melt indexer (Toyo Seiki Seisaku-sho, Ltd.).

The fluororesin layer (B) in the present invention may contain one of these fluororesins (b1) or may contain two or more thereof.

The fluororesin (b1) that is a perhalo polymer leads to better chemical resistance and lower fuel permeability. The perhalo polymer is a polymer in which all the carbon atoms constituting the main chain of the polymer are coupled with halogen atoms.

The fluororesin layer (B) may further contain any of various fillers such as inorganic powder, glass fibers, carbon powder, carbon fibers, and metal oxides to the extent that the performance thereof is not impaired in accordance with the purpose and the application thereof.

For example, in order to much lower the fuel permeability, smectite-type lamellar viscous minerals, such as montmorillonite, beidellite, saponite, nontronite, hectorite, sauconite, and stevensite, and high aspect ratio fine lamellar minerals, such as mica, may be added.

In order to impart conductivity, a conductive filler may be added. Any conductive filler may be used, and examples thereof include powder or fiber of conductive simple substance such as metal or carbon; powder of a conductive compound such as zinc oxide; and powder whose surface is subjected to conductivity-imparting treatment. In the case of adding a conductive filler, the filler is preferably melt-kneaded into pellets in advance.

The powder of conductive simple substance or the fiber of conductive simple substance may be any powder or fiber, and examples thereof include powder of metal such as copper or nickel; fiber of metal such as iron or stainless steel; and carbon black, carbon fiber, and carbon fibril described in JP H03-174018 A.

The powder whose surface is subjected to conductivity-imparting treatment is a powder obtained by subjecting the surface of non-conductive powder such as glass beads or titanium oxide powder to conductivity-imparting treatment.

The conductivity-imparting treatment on the surface may be performed by any method, and examples thereof include metal spattering and electroless plating.

Carbon black is suitably used among the above conductive fillers because of advantages in economic efficiency and prevention of storage of static electricity.

The fluororesin composition containing a conductive filler preferably has a volume resistivity of $1 \times 10^0$ to $1 \times 10^9$ Ω·m. The lower limit thereof is more preferably $1 \times 10^2$ Ω·cm, and the upper limit thereof is more preferably $1 \times 10^8$ Ω·cm.

In addition to the filler, other appropriate additives such as thermal stabilizers, reinforcing agents, ultraviolet absorbers, and pigments may be added.

One preferred embodiment of the laminate of the present invention is a laminate in which the basic multifunctional compound is at least one selected from the group consisting of N,N'-dicinnamylidene-1,6-hexamethylenediamine and hexamethylenediamine, the fluororubber (a1) is at least one selected from the group consisting of a VdF/CH$_2$=CFRf$^1$ copolymer (wherein Rf$^1$ is a C1-C12 linear or branched fluoroalkyl group), a TFE/propylene copolymer, an ethylene/TFE/PAVE copolymer, and a VdF/HFP/TFE/PAVE/ethylene copolymer, and the fluororesin layer (B) is formed from the fluororesin (b1) that is a CTFE/TFE/PAVE copolymer.

In bonding of the fluororubber layer (A) and the fluororesin layer (B) to form the laminate, presumably, the multifunctional compound contained in the fluororubber composition generates a double bond in both the fluororesin (b1) and the fluororubber (a1), and the generated double bonds are co-vulcanized, so that the fluororubber layer (A) and the fluororesin layer (B) are firmly bonded to each other.

A fluororubber having excellent amine resistance, such as a VdF/CH$_2$=CFRf$^1$ copolymer (wherein Rf$^4$ is a C1-C12 linear or branched fluoroalkyl group), a TFE/propylene copolymer, an ethylene/TFE/PAVE copolymer, or a VdF/HFP/TFE/PAVE/ethylene copolymer, is less likely to have a double bond even if the fluororubber and the multifunctional compound are mixed in vulcanization of the fluororubber composition, and thus the multifunctional compound is not consumed. As a result, in bonding of the fluororubber layer (A) and the fluororesin layer (B), presumably, a double bond is generated in both the fluororesin (b1) and the fluororubber (a1) and the aforementioned co-vulcanization proceeds, so that the fluororubber layer (A) and the fluororesin layer (B) are firmly bonded to each other.

If a fluororubber having low amine resistance is used, a double bond is generated in the fluororubber in vulcanization, and thus is consumed. As a result, presumably, a sufficient amount of the double bond is not generated in the fluororesin in bonding the fluororubber and the fluororesin, so that the aforementioned co-vulcanization does not sufficiently proceed.

(Laminate)

In the laminate of the present invention, the fluororubber layer (A) may have any thickness, and the thickness thereof is preferably 100 μm or greater. The upper limit of the thickness of the fluororubber layer (A) is 5000 μm, for example.

The fluororesin layer (B) may have any thickness, and the thickness thereof is preferably 10 μm or greater, for example. The upper limit of the thickness of the fluororesin layer (B) is 1000 μm, for example.

The laminate of the present invention preferably has an initial interlayer bond strength of 5 N/cm or higher.

The laminate having an initial interlayer bond strength of 5 N/cm or higher is advantageously less likely to cause a shear in vulcanization into a hose with a specific shape and peeling even if an impact is applied.

Since the laminate of the present invention has the aforementioned configuration, the laminate can have an initial interlayer bond strength within the above range. The initial-interlayer bond strength is more preferably 10 N/cm or higher, still more preferably 15 N/cm or higher.

The initial interlayer bond strength is an average value calculated from the data (N=3) obtained by measuring the bond strength by a peeling test at 25° C. and a tensile rate of 50 mm/min in conformity with JIS K6256 (Adhesion testing methods for rubber, vulcanized).

In the laminate of the present invention, the fluororubber layer (A) and the fluororesin layer (B) are preferably vulcanization-bonded. Such a laminate can be obtained by stacking the unvulcanized fluororubber layer (A) and the fluororesin layer (B), and then vulcanizing the layers.

The vulcanization may be performed by any conventionally known vulcanization method for fluororubber compositions under conventionally known vulcanization conditions. Examples of the method include a method of vulcanizing an unvulcanized laminate for a long time, and a method of heating an unvulcanized laminate in a relatively short time as a pre-treatment (vulcanization also occurs at this stage), and then vulcanizing the laminate for a long time. Preferred among these is the method of heating an unvulcanized laminate in a relatively short time as a pre-treatment, and then vulcanizing the laminate for a long time. This is because the method easily provides close bonding between the fluororubber layer (A) and the fluororesin layer (B) in the pre-treatment, and the fluororubber layer (A) is vulcanized in the pre-treatment and thus the shape thereof is stabilized, so that a method of holding the laminate in the following vulcanization can be selected from any various methods.

The vulcanization conditions may be any usual conditions. The vulcanization treatment is preferably performed at 140° C. to 180° C. for 2 to 80 minutes using steam, a press, an oven, an air bath, infrared radiation, or microwaves, or by lead-covered vulcanization. The vulcanization is more preferably performed at 150° C. to 170° C. for 5 to 60 minutes. The vulcanization may be divided into primary vulcanization and secondary vulcanization.

The present invention also relates to a method of manufacturing a laminate, including: mixing the fluororubber (a1) and the basic multifunctional compound having at least two nitrogen atoms in the molecule with a distance between the nitrogen atoms in the molecule of 5.70 Å or greater to provide a fluororubber composition; stacking an unvulcanized fluororubber layer prepared by molding the fluororubber composition and a fluororesin layer; and vulcanizing the unvulcanized fluororubber layer and the fluororesin layer stacked, the fluororubber composition containing the fluororubber (a1) and the basic multifunctional compound, the fluororubber (a1) having an absorption coefficient at 1720 cm$^{-1}$, determined after being brought into contact with triethyl amine, of 0.35 or lower, the fluororesin layer being formed from a fluororesin (b1) having a fuel permeability coefficient of 2.0 g·mm/m$^2$/day or lower.

The manufacturing method of the present invention can provide the aforementioned laminate of the present invention.

In the manufacturing method of the present invention, the vulcanization conditions are the same as mentioned above.

The step of mixing the fluororubber (a1) and the basic multifunctional compound to provide a fluororubber composition may be kneading the fluororubber (a1) and the basic multifunctional compound using a commonly used rubber-kneading device, for example.

The rubber-kneading device used may be a roll, a kneader, a Banbury mixer, an internal mixer, a twin-screw extruder, or the like.

In addition to the fluororubber (a1) and the basic multifunctional compound, any other additives such as the compound (a2), a vulcanizing agent, a vulcanization aid, a co-vulcanizing agent, a vulcanization accelerator, and a filler may also be mixed, if necessary.

The mixing temperature is 20° C. to 200° C., for example. The mixing time is 2 to 80 minutes, for example.

Stacking of the unvulcanized fluororubber layer and the fluororesin layer may be achieved by any of a method of preparing an unvulcanized fluororubber layer and a fluororesin layer separately and then stacking the layers by, for example, compression; a method of simultaneously preparing and stacking an unvulcanized fluororubber layer and a fluororesin layer; and a method of applying a fluororesin to an unvulcanized fluororubber layer to form a fluororesin layer.

In the method of preparing an unvulcanized fluororubber layer and a fluororesin layer separately and then stacking the layers by, for example, compression, a fluororesin and a fluororubber composition may be molded by the same molding method or may be molded by different molding methods.

The unvulcanized fluororubber layer may be formed into a molded article having any shape such as a sheet or tube by heat compression molding, transfer molding, extrusion molding, injection molding, calender molding, or application of the fluororubber composition.

The fluororesin layer may be formed by, for example, heat compression molding, melt extraction molding, injection molding, or application (including powder coating). The molding may be achieved using any commonly used molding device for fluororesin, such as an injection molding device, a blow molding device, an extrusion molding device, or any coating device, and a laminate having any of various shapes such as a sheet and a tube can be produced. For excellent productivity, melt extraction molding is preferred.

One example of the method of simultaneously preparing and stacking an unvulcanized fluororubber layer and a fluororesin layer is a method of molding and simultaneously stacking the fluororubber composition for providing an unvulcanized fluororubber layer and the fluororesin (b1) for providing a fluororesin layer by multilayer compression molding, multilayer transfer molding, multilayer extrusion molding, multilayer injection molding, or doubling. In this method, the unvulcanized fluororubber layer, which is an unvulcanized molded article, and the fluororesin layer are simultaneously stacked. Thus, the method does not require a step of closely bonding the unvulcanized fluororubber layer and the fluororesin layer, and is suitable for achieving firm bonding in the following vulcanization step. If the bonding is insufficient, a closely bonding step such as wrapping may be performed.

(Layer Structure of Laminate)

The laminate of the present invention may have a bilayer structure of the fluororubber layer (A) and the fluororesin layer (B), or may have a structure in which the fluororubber layer (A) is stacked on both sides of the fluororesin layer (B), or in which the fluororesin layer (B) is stacked on both sides of the fluororubber layer (A).

For example, the laminate may have a trilayer structure of fluororubber layer (A)/fluororesin layer (B)/fluororubber layer (A) or of fluororesin layer (B)/fluororubber layer (A)/fluororesin layer (B).

Alternatively, the laminate may have a multilayer structure of three or more layers in which the fluororubber layer (A), the fluororesin layer (B), and another polymer layer (C) are bonded to each other, or a structure in which a polymer layer (D) is stacked on one or both of the sides of the trilayer structure of the fluororubber layer (A), the fluororesin layer (B), and another polymer layer (C) bonded to each other. The polymer layer (C) and the polymer layer (D) may be the same as or different from each other.

The laminate of the present invention may have a polymer layer (C) on one or both of the sides of the trilayer structure of fluororubber layer (A)/fluororesin layer (B)/fluororubber layer (A).

The polymer layers (C) and (D) each may be a rubber layer (C1) or (D1) other than the fluororubber layer (A). The rubber layer (C1) or (D1) may be a fluorine-free rubber layer (C1a) or (D1a) formed from fluorine-free rubber, for example. The fluorine-free rubber is preferred because of good cold resistance and excellent cost efficiency. The fluorine-free rubber layer (C1a) and the fluorine-free rubber layer (D1a) may be formed from the same fluorine-free rubber, or may be formed from different fluorine-free rubbers.

The laminate of the present invention may include the fluororubber layer (A), the fluororesin layer (B), and the fluorine-free rubber layer (C1a) stacked in the order set forth.

Alternatively, the laminate may include the fluorine-free rubber layer (D1a) and have a structure in which the fluorine-free rubber layer (D1a), the fluororubber layer (A), the fluororesin layer (B), and the fluorine-free rubber layer (C1a) are stacked in the order set forth, a structure in which the fluororubber layer (A), the fluororesin layer (B), the fluorine-free rubber layer (D1a), and the fluorine-free rubber layer (C1a) are stacked in the order set forth, or a structure in which the fluororubber layer (A), the fluororesin layer (B), the fluorine-free rubber layer (C1a), and the fluorine-free rubber layer (D1a) are stacked in the order set forth.

Specific examples of the fluorine-free rubber include diene rubbers such as acrylonitrile-butadiene rubber (NBR) or a hydride thereof (HNBR), styrene-butadiene rubber (SBR), chloroprene rubber (CR), polybutadiene rubber (BR), natural rubber (NR), and isoprene rubber (IR); ethylene-propylene-termonomer copolymer rubber, silicone rubber, butyl rubber, epichlorohydrin rubber, acrylic rubber, chlorinated polyethylene (CPE), polyblend of acrylonitrile-butadiene rubber and vinyl chloride (PVC-NBR), and ethylene-propylene-diene rubber (EPDM). Examples also include rubbers prepared by mixing any of these fluorine-free rubbers and fluororubbers at any ratio.

For good heat resistance, oil resistance, weather resistance, and extrusion moldability, the fluorine-free rubber is preferably diene rubber or epichlorohydrin rubber. NBR, HNBR, or epichlorohydrin rubber is more preferred. The rubber layer (C1) is preferably formed from NBR, HNBR, or epichlorohydrin rubber.

For good weather resistance and cost efficiency, the rubber layer (D1) is preferably formed from acrylonitrile-butadiene rubber, epichlorohydrin rubber, chlorinated polyethylene (CPE), polyblend of acrylonitrile-butadiene rubber and vinyl chloride (PVC-NBR), ethylene-propylene-diene rubber (EPDM), acrylic rubber, or any mixture thereof. Non-vulcanized rubber compositions for forming the rubber layers (C1) and (D1) may also contain a vulcanizing agent and any other compounding agents.

Next, the layer structure of the laminate of the present invention is described in more detail below.

(1) Bilayer Structure of Fluororubber Layer (A)/Fluororesin Layer (B)

This is a basic structure. Conventional structures of this type suffer insufficient bonding between the fluororubber layer and the fluororesin layer, and thus stacking of the fluororesin layer (B) and the fluororubber layer (A) requires surface treatment on the resin side, application of additional adhesive between the layers, or fixing of the layers by wrapping a tape-like film, causing complication of the steps. In the present invention, vulcanization leads to vulcanization bonding, so that chemically firm bonding between the layers is achieved without such complicated steps.

(2) Trilayer Structure of Rubber Layer/Fluororesin Layer (B)/Rubber Layer

Examples of this structure include a trilayer structure of fluororubber layer (A)/fluororesin layer (B)/fluororubber layer (A) and a trilayer structure of fluororubber layer (A)/fluororesin layer (B)/rubber layer (C1).

If sealability is required, for example, in the case of joint portions of fuel pipes, the rubber layer is preferably provided on both sides of the structure so as to secure the sealability. The rubber layers of the inner and outer layers may be the same as or different from each other.

In the case of a trilayer structure of fluororubber layer (A)/fluororesin layer (B)/rubber layer (C1), the rubber layer (C1) is preferably a layer formed from acrylonitrile-butadiene rubber, hydrogenated acrylonitrile-butadiene rubber, epichlorohydrin rubber, or a mixture of acrylonitrile-butadiene rubber and acrylic rubber.

In order to improve the chemical resistance and the low fuel permeability, a fuel pipe may have a trilayer structure of fluororubber layer (A)/fluororesin layer (B)/rubber layer (C1) in which the rubber layer (C1) is a fluororubber layer and is used as an inner layer of the pipe.

(3) Trilayer Structure of Resin Layer/Fluororubber Layer (A)/Resin Layer

Examples of this structure include a trilayer structure of fluororesin layer (B)/fluororubber layer (A)/fluororesin layer (B). The resin layers of the inner and outer layers may be the same as or different from each other.

(4) Trilayer Structure of Fluororesin Layer (B)/Fluororubber Layer (A)/Rubber Layer (C1)

(5) Four or more Layer Structure

In addition to the trilayer structures (2) to (4), any of the fluororubber layer (A), the rubber layer (C1), or the resin layer (B) may be further stacked in accordance with the purpose thereof. Another layer such as metal foil may be disposed, and an adhesive layer may be interposed between the layers, excluding between the fluororubber layer (A) and the fluororesin layer (B).

Further, the polymer layer (C) may be stacked to form a lined article.

The parameters such as thicknesses and shapes of the respective layers may be appropriately selected in accordance with the purpose and form of use, for example.

In order to improve the pressure resistance, a reinforcing layer of reinforcing thread, for example, may be appropriately provided.

The laminate of the present invention has excellently low fuel permeability, as well as excellent heat resistance, oil resistance, fuel oil resistance, antifreeze resistance, steam resistance, weather resistance, and ozone resistance. Further, the laminate is sufficiently tolerant of use under severe conditions, and thus can be used in various applications.

For example, the laminate have properties suitable for engine bodies, main drive systems, valve train systems, lubrication and cooling systems, fuel systems, and intake and exhaust systems of automobile engines, transmission systems of driveline systems, steering systems and braking systems of chassis, and gaskets, seals such as non-contact or contact packings (e.g., self-seal packings, piston rings, split ring packings, mechanical seals, oil seals), bellows, diaphragms, hoses, tubes, and electric wires, which are required to have heat resistance, oil resistance, fuel oil resistance, antifreeze resistance, and steam resistance, of basic electrical parts of electrical equipment, electrical parts of control systems, and electrical equipment accessories.

Specifically, the laminate can be used in the following applications:

gaskets such as cylinder head gaskets, cylinder head cover gaskets, sump packings, and general gaskets, seals such as O-rings, packings, and timing belt cover gaskets, and hoses such as control hoses, of engine bodies, anti-vibration rubbers of engine mounts, and sealants for high-pressure valves in hydrogen storage systems;

shaft seals such as crankshaft seals and camshaft seals of main drive systems;

valve stem seals such as engine valves of valve train systems;

engine oil cooler hoses of engine oil coolers, oil return hoses, seal gaskets, water hoses used around radiators, and vacuum pump oil hoses of vacuum pumps, of lubrication and cooling systems; and oil seals, diaphragms, and valves of fuel pumps, fuel hoses such as filler (neck) hoses, fuel supply hoses, fuel return hoses, and vapor (evaporator) hoses, in-tank hoses, filler seals, tank packings, and in-tank fuel pump mounts of fuel tanks, tube bodies and connector O-rings of fuel pipe tubes, injector cushion rings, injector seal rings, injector O-rings, pressure regulator diaphragms, and check valves of fuel injection systems, needle valve petals, accelerator pump pistons, flange gaskets, and control hoses of carburetors, and valve seats and diaphragms of combined air controlling (CAC) systems in fuel systems. In particular, the laminate is suitable for fuel hoses and in-tank hoses of fuel tanks.

The laminate can also be used in the following applications: intake manifold packings and exhaust manifold packings of manifolds, diaphragms, control hoses, and emission control hoses of exhaust gas recirculation (EGR) systems, diaphragms of BPT, after burn preventive valve sheets of AB valves, throttle body packings of throttles, turbo oil hoses (supply), turbo oil hoses (return), turbo air hoses, intercooler hoses, and turbine shaft seals of turbochargers, of intake and exhaust systems;

transmission-related bearing seals, oil seals, O-rings, packings, and torque converter hoses, and gear oil hoses, ATF hoses, O-rings, and packings of ATs, of transmission systems;

power steering oil hoses of steering systems;

oil seals, O-rings, packings, brake fluid hoses, air valves, vacuum valves, and diaphragms of vacuum servos, piston cups (rubber cups) of master cylinders, caliper seals, and boots, of braking systems;

insulators and sheaths of electric wires (harnesses), and tubes of harness-holding parts of basic electrical equipment;

cover materials for sensor lines of control system electrical equipment; and

O-rings, packings, and air conditioner hoses of electrical equipment, and wiper blades of exterior parts.

In addition to the field of automobiles, the laminate of the present invention can be suitably used in following applications: oil-resistant, chemical-resistant, heat-resistant, steam-resistant, or weather-resistant packings, O-rings, hoses, other sealants, diaphragms, and valves in a means of transportation, such as shipment and aircraft; similar packings, O-rings, sealants, diaphragms, valves, hoses, rolls, tubes, chemical-resistant coatings, and linings in chemical plants; hoses and gaskets in the field of chemical treatment; similar packings, O-rings, hoses, sealants, belts, diaphragms, valves, rolls, and tubes in food plant equipment and food-related devices (including household utensils); similar packings, O-rings, hoses, sealants, diaphragms, valves, and tubes in nuclear power plant equipment; similar packings, O-rings, hoses, sealants, diaphragms, valves, rolls, tubes, linings, mandrels, electric wires, expansion joints, belts, rubber plates, and weather strips in OA equipment and general industrial parts; and roll blades of plain paper copiers. For example, back-up rubber materials of PTFE diaphragms are poor in slidability, and thus are worn down or broken during use. In contrast, the laminate of the present invention can solve such problems, and thus is suitably used.

In the case of food-related rubber sealants, there are scent absorption of conventional rubber sealants and contamination of foods by rubber chips. In contrast, the laminate of the present invention can solve such problems, and thus is suitably used. In the case of medical and chemical applications, rubber materials used as sealants for pipes using rubber sealant solvents disadvantageously swell by the solvent. In contrast, the laminate of the present invention can solve such problems because the rubber is covered with resin. In general industrial fields, the laminate can be suitably used for rubber rolls, O-rings, packings, and sealants in order to improve the strength, slidability, chemical resistance, and permeability of rubber materials. In particular, the laminate can be suitably used for packing of lithium ion batteries because the laminate maintains the chemical resistance and the sealability simultaneously. Further, the laminate can be suitably used in applications requiring slidability with low friction.

The laminate is particularly suitably used as a tube or a hose. In other words, the laminate is preferably a tube or a hose. For good heat resistance and low fuel permeability, the laminate can be suitably used as a fuel pipe tube or hose for automobiles among tubes.

Fuel pipes formed from the laminate of the present invention can be produced by any usual method.

EXAMPLES

The present invention will be more specifically described hereinbelow with reference to, but not limited to, examples.

In the examples and comparative examples, the physical properties were determined by the following methods.

(1) Composition of Polymer

The composition of the polymer was determined by $^{19}$F-NMR analysis.

(2) Melting Point

The melting peak with a temperature-increasing rate of 10° C./min was recorded using a DSC device (Seiko Instruments Inc.), and the temperature corresponding to the maximum value was defined as the melting point.

(3) Melt Flow Rate (MFR)

The weight (g) of the polymer flowed out of a nozzle (diameter: 2 mm, length: 8 mm) per unit time (10 minutes) was determined at 297° C. and 5 kg load using a melt indexer (Toyo Seiki Seisaku-sho, Ltd.).

(4) Measurement of Fuel Permeability Coefficient of Fluororesin

The fluororesin pellets were put into a mold having a diameter of 120 mm. The workpiece was mounted on a press heated up to 300° C., and melt-pressed at a pressure of about 2.9 MPa. Thereby, a fluororesin sheet having a thickness of 0.15 mm was obtained. This sheet was put into a SUS316 cup for fuel permeability coefficient measurement (inner diameter: 40 mmφ, height: 20 mm) containing 18 mL of CE10 (fuel prepared by mixing a mixture of isooctane and toluene at a volume ratio of 50:50 and 10 vol % of ethanol), and the mass change at 60° C. was measured for 1000 hours. The fuel permeability coefficient (g·mm/m$^2$/day) was calculated from the mass change per hour (the period during which the mass change is constant at the initial stage of the measurement), and the surface area and thickness of the sheet at the liquid-contact portion.

(5) Absorption coefficient at 1720 cm$^{-1}$ determined after being brought into contact with triethyl amine First, 0.56 g of the polymer (fluororubber) was completely dissolved in 10 cc of acetone, tetrahydrofuran (THF), or methyl ethyl ketone (MEK), and then 4.9 g of triethyl amine was added thereto. The solution was moved into a Petri dish, and the acetone, THF, or MEK was evaporated. The Petri dish together with the residue therein was heated in a 70° C. temperature-constant tank for 3 h. The polymer after the heating was analyzed by infrared spectroscopy (IR).

In the IR analysis results, the peak intensity at 1720 cm$^{-1}$, with the absorption coefficient at 3000 to 3030 cm$^{-1}$ being defined as 1.0, was defined as the absorption coefficient at 1720 cm$^{-1}$.

The materials used in the examples and comparative examples are shown below.

Fluororesin (1)
CTFE/PPVE/TFE copolymer, CTFE/PPVE/TFE=21.3/2.4/76.3 (mol %), fuel permeability coefficient: 0.4 g·mm/m$^2$/day Fluororesin (2)
CTFE homopolymer, fuel permeability coefficient: 1.9 g·mm/m$^2$/day Fluororesin (3)
VDF/TFE/HFP copolymer, VDF/TFE/HFP=20.0/74.6/5.4 (mol %), fuel permeability coefficient: 2.5 g·mm/m$^2$/day Fluororesin (4)
VDF/TFE/HFP copolymer, VDF/TFE/HFP=15.0/79.6/5.4 (mol %), fuel permeability coefficient: 1.4 g·mm/m$^2$/day Fluororubber (1)
TFE/propylene copolymer, trade name: Aflas 150P (Asahi Glass Co., Ltd.), absorption coefficient at 1720 cm$^{-1}$ determined after being brought into contact with triethyl amine: 0.07

Fluororubber (2)
VdF/2,3,3,3-tetrafluoropropene copolymer, fluorine content: 62%, Mooney viscosity (ML$_{(1+10)}$ (121° C.))=35, absorption coefficient at 1720 cm$^{-1}$ determined after being brought into contact with triethyl amine: 0.07

Fluororubber (3)
VdF/2,3,3,3-tetrafluoropropene copolymer, fluorine content: 61%, Mooney viscosity (ML$_{(1+10)}$ (121° C.))=30, absorption coefficient at 1720 cm$^{-1}$ determined after being brought into contact with triethyl amine: 0.06

Fluororubber (4)
VdF/HFP/TFE/PMVE/ethylene copolymer, trade name: BR-9151, absorption coefficient at 1720 cm$^{-1}$ determined after being brought into contact with triethyl amine: 0.17

Fluororubber (5)
ethylene/TFE/PMVE copolymer, trade name: ETP-600S, Mooney viscosity (ML$_{(1+10)}$ (121° C.))=63, absorption coefficient at 1720 cm$^{-1}$ determined after being brought into contact with triethyl amine: 0.07

Fluororubber (6)
VdF/HFP copolymer, fluorine content: 66%, Mooney viscosity (ML$_{(1+10)}$ (121° C.))=20, absorption coefficient at 1720 cm$^{-1}$ determined after being brought into contact with triethyl amine: 0.29

Fluororubber (7)
VdF/TFE/PMVE copolymer, fluorine content: 66%, Mooney viscosity (ML$_{(1+10)}$ (100° C.))=67, absorption coefficient at 1720 cm$^{-1}$ determined after being brought into contact with triethyl amine: 0.38

Basic Multifunctional Compound:
N,N'-dicinnamylidene-1,6-hexamethylenediamine, distance between N atoms in molecule: 8.80 Å
hexamethylenediamine, distance between N atoms in molecule: 8.90 Å
p-phenylenediamine, distance between N atoms in molecule: 5.66 Å

Amine Compound:
dodecylamine

DBU Salt:
8-benzyl-1,8-diazabicyclo(5.4.0)-7-undecenium chloride
formic acid salt of DBU Melamine:
melamine, distance between N atoms in molecule: 4.61 Å

Carbon Black:
carbon black (N990)

Calcium Hydroxide:
calcium hydroxide

MgO:
magnesium oxide

Vulcanizing Agent:
triallyl isocyanurate
2,5-dimethyl-2,5-di(t-butylperoxy)hexane Polyol:
bisphenol AF Organic phosphonium salt/bis A (1:2):
GP-21

Examples 1 to 22

(Production of Fluororubber Composition)

The materials shown in one of the following Tables 1 to 7 were kneaded using an 8-inch open roll, and thereby an about 2-mm-thick sheet-like rubber composition for vulcanization was obtained. The unit of the values in Tables 1 to 7 is "part(s) by mass". The maximum torque value (MH) and the minimum torque value (ML) of the rubber composition for vulcanization were determined at 160° C. using a curelastometer type-II (model No.: JSR curelastometer, JSR Corp.). Thereby, the induction time (T10) and the optimal vulcanization time (T90) were determined. The measurement results are shown in the tables. Here, T10 represents the time satisfying {(MH)−(ML)}×0.1+ML, T90 represents the time satisfying {(MH)−(ML)}×0.9+ML, and MH and ML are values determined in conformity with JIS K6300-2.

(Production of Laminate)

The rubber composition sheet for vulcanization having a thickness of about 2 mm and the fluororesin sheet were stacked. The stacked sheets were put into a mold that can provide a sheet having a thickness of 2 mm, and the sheets were pressed at 160° 0 for 45 minutes. Thereby, a sheet-like laminate was obtained.

In Example 19, the rubber composition sheet for vulcanization having a thickness of about 1 mm was stacked on both sides of the fluororesin sheet. The stacked sheets were put into a mold that can provide a sheet having a thickness of 2 mm, and the sheets were pressed at 160° C. for 45 minutes. Thereby, a sheet-like laminate was obtained.

Comparative Examples 1 to 14

(Production of Comparative Fluororubber Composition)

The materials shown in one of the following Tables 1 to 4 and 8 were kneaded using an 8-inch open roll, and thereby an about 2-mm-thick sheet-like rubber composition for vulcanization was obtained. The unit of the values in Tables 1 to 4 and 8 is part(s) by mass. The maximum torque value (MH) and the minimum torque value (ML) of the rubber composition for vulcanization were determined at 160° C. using a curelastometer type-II (model No.: JSR curelastometer, JSR Corp.). Thereby, the induction time (T10) and the optimal vulcanization time (T90) were determined. The measurement results are shown in the tables. Here, T10 represents the time satisfying {(MH)−(ML)}×0.1+ML, T90 represents the time satisfying {(MH)−(ML)}×0.9+ML, and MH and ML are values determined in conformity with JIS K6300-2.

(Production of Comparative Laminate)

The rubber composition sheet for vulcanization having a thickness of about 2 mm and the fluororesin sheet were stacked. The stacked sheets were put into a mold that can provide a sheet having a thickness of 2 mm, and the sheets were pressed at 160° C. for 45 minutes. Thereby, a sheet-like laminate was obtained.

(Evaluation of Bonding)

The resulting laminate was cut into three rectangular samples each having a width of 10 mm×length of 40 mm. Each sample was subjected to a peeling test at 25° C. and a tensile rate of 50 ram/min using an autograph (AGS-J 5kN, Shimadzu Corp.) in conformity with the method disclosed in JIS K6256 (Adhesion testing methods for rubber, vulcanized). The peeling mode was observed and evaluated in accordance with the following criteria.

Good: The rubber composition for vulcanization or the fluororesin suffered material failure at the interface of the laminate, so that the peeling at the interface was impossible.

Acceptable: The laminate was peeled at the interface, and the peeling strength at the interface was 5 N/cm or higher.

Poor: The laminate was peeled at the interface, and the peeling strength at the interface was lower than 5 N/cm.

TABLE 1

| Type of compounding agent | Name of material | Example 1 | Example 2 | Example 3 | Example 4 | Comparative Example 1 | Example 5 |
|---|---|---|---|---|---|---|---|
| Base polymer | Fluororubber (1) | 100.0 | 100.0 | 100.0 | 100.0 | 100.0 | 100.0 |
| Carbon black | Carbon black (N990) | 30.0 | 30.0 | 20.0 | 30.0 | 30.0 | 30.0 |
| Vulcanizing agent | Triallyl isocyanurate | 2.0 | 2.0 | 2.0 | 2.0 | 2.0 | 2.0 |
| Vulcanizing agent | 2,5-Dimethyl-2,5-di(t-butylperoxy)hexane | 2.0 | 2.0 | 2.0 | 2.0 | 2.0 | 2.0 |
| MgO | Magnesium oxide | 5.0 | 5.0 | 5.0 | 5.0 | 5.0 | 5.0 |
| DBU salt | Formic acid salt of DBU | | | | | | 2.0 |
| Basic multifunctional compound | N,N'-dicinnamylidene-1,6-hexamethylenediamine | 10.0 | 5.0 | 5.0 | 3.0 | | 1.5 |
| | Sum | 149.0 | 144.0 | 134.0 | 142.0 | 139.0 | 142.5 |
| Curelastometer type-II, 160° C. | ML (N) | | | | | | |
| | MH (N) | | | | | | |
| | T10 (min) | | | | | | |
| | T90 (min) | | | | | | |
| | Bonding vs fluororesin (1) 160° C. × 45 min | Good 18 N/cm | Good 20 N/cm | Good 20 N/cm | Good 21 N/cm | Poor 0 N/cm | Good 21 N/cm |

TABLE 2

| Type of compounding agent | Name of material | Comparative Example 2 | Comparative Example 3 | Comparative Example 4 | Example 6 | Example 7 | Example 8 |
|---|---|---|---|---|---|---|---|
| Base polymer | Fluororubber (2) | 100.0 | 100.0 | 100.0 | 100.0 | 100.0 | 100.0 |
| Carbon black | Carbon black (N990) | 20.0 | 20.0 | 20.0 | 20.0 | 20.0 | 20.0 |
| Vulcanizing agent | Triallyl isocyanurate | 4.0 | 4.0 | 4.0 | 4.0 | 4.0 | 4.0 |
| Vulcanizing agent | 2,5-Dimethyl-2,5-di(t-butylperoxy)hexane | 1.5 | 1.5 | 1.5 | 1.5 | 1.5 | 1.5 |

TABLE 2-continued

| Type of compounding agent | Name of material | Comparative Example 2 | Comparative Example 3 | Comparative Example 4 | Example 6 | Example 7 | Example 8 |
|---|---|---|---|---|---|---|---|
| DBU salt | 8-Benzyl-1,8-diazabicyclo(5.4.0)-7-undecenium chloride | 3.0 | 3.0 | 3.0 | | | 3.0 |
| Polyol | Bisphenol AF | | 3.0 | 3.0 | | | |
| Basic multifunctional compound | N,N'-dicinnamylidene-1,6-hexamethylenediamine | | | | 10.0 | 3.0 | 3.0 |
| Organic phosphonium salt/ bis A (1:2) | GP-21 | | | 2.0 | | | |
| Sum | | 128.5 | 131.5 | 133.5 | 135.5 | 128.5 | 131.5 |
| Curelastometer type-II, 160° C. ML (N) | | | | | 0.49 | | |
| MH (N) | | | | | 0.98 | | |
| T10 (min) | | | | | 0.5 | | |
| T90 (min) | | | | | 10.0 | | |
| Bonding vs fluororesin (1) 160° C. × 45 min | | Poor 0 N/cm | Poor 0 N/cm | Poor 0 N/cm | Good 19 N/cm | Good 17 N/cm | Good 21 N/cm |

TABLE 3

| Type of compounding agent | Name of material | Comparative Example 5 | Example 9 | Example 10 | Comparative Example 6 | Example 11 |
|---|---|---|---|---|---|---|
| Base polymer | Fluororubber (3) | 100.0 | 100.0 | 100.0 | 100.0 | 100.0 |
| Carbon black | Carbon black (N990) | 20.0 | 20.0 | 20.0 | 20.0 | 20.0 |
| Vulcanizing agent | Triallyl isocyanurate | 4.0 | 4.0 | 4.0 | 4.0 | 4.0 |
| Vulcanizing agent | 2,5-Dimethyl-2,5-di(t-butylperoxy)hexane | 1.5 | 1.5 | 1.5 | 1.5 | 4.0 |
| Calcium hydroxide | Calcium hydroxide | | | | 6.0 | |
| MgO | Magnesium oxide | | | | 3.0 | |
| DBU salt | 8-Benzyl-1,8-diazabicyclo(5.4.0)-7-undecenium chloride | | | 2.0 | 3.0 | |
| Melamine | Melamine (rubber chemical 1) | | | | | |
| Basic multifunctional compound | N,N'-dicinnamylidene-1,6-hexamethylenediamine | | 3.0 | 2.0 | | 3.0 |
| Basic multifunctional compound | Hexamethylenediamine | | | | | |
| Amine compound | Dodecylamine | | | | | |
| Basic multifunctional compound | p-Phenylenediamine | | | | | |
| Sum | | 125.5 | 128.5 | 129.5 | 137.5 | 131.0 |
| Curelastometer type-II, 160° C. ML (N) | | 0.4 | 0.4 | 0.6 | 1.1 | |
| MH (N) | | 6.9 | 6.9 | 9.0 | 44.0 | |
| T10 (min) | | 4.1 | 4.1 | 3.5 | 1.3 | |
| T90 (min) | | 22.0 | 22.0 | 16.0 | 11.7 | |
| Bonding vs fluororesin (1) 160° C. × 45 min | | Poor 0 N/cm | Good 22 N/cm | Good 19 N/cm | Poor 0 N/cm | Good 21 N/cm |
| Bonding vs fluororesin (2) 160° C. × 45 min | | — | — | — | — | Good 23 N/cm |
| Bonding vs fluororesin (3) 160° C. × 45 min | | — | — | — | — | — |
| Bonding vs fluororesin (4) 160° C. × 45 min | | — | — | — | — | Good 22 N/cm |

| Type of compounding agent | Name of material | Comparative Example 7 | Example 12 | Example 13 | Example 14 | Comparative Example 8 |
|---|---|---|---|---|---|---|
| Base polymer | Fluororubber (3) | 100.0 | 100.0 | 100.0 | 100.0 | 100.0 |
| Carbon black | Carbon black (N990) | 20.0 | 20.0 | 20.0 | 20.0 | 20.0 |
| Vulcanizing agent | Triallyl isocyanurate | 4.0 | 4.0 | 4.0 | 4.0 | 4.0 |
| Vulcanizing agent | 2,5-Dimethyl-2,5-di(t-butylperoxy)hexane | 4.0 | 1.5 | 1.5 | 1.5 | 1.5 |
| Calcium hydroxide | Calcium hydroxide | | | | | |
| MgO | Magnesium oxide | | | | | |
| DBU salt | 8-Benzyl-1,8-diazabicyclo(5.4.0)-7-undecenium chloride | | | 2.0 | 3.0 | |
| Melamine | Melamine (rubber chemical 1) | | | | | |
| Basic multifunctional compound | N,N'-dicinnamylidene-1,6-hexamethylenediamine | 3.0 | 1.0 | 1.0 | | |
| Basic multifunctional compound | Hexamethylenediamine | | | | 1.0 | |
| Amine compound | Dodecylamine | | | | | 3.2 |
| Basic multifunctional compound | p-Phenylenediamine | | | | | |

TABLE 3-continued

|  | | | | | | |
|---|---|---|---|---|---|---|
| Sum | | 131.0 | 128.5 | 129.5 | 126.5 | 128.7 |
| Curelastometer type-II, 160° C. | ML (N) | | 0.7 | 0.6 | 1.5 | |
| | MH (N) | | 16.4 | 14.5 | 17.6 | 11.8 |
| | T10 (min) | | 2.6 | 2.5 | 0.7 | 0.8 |
| | T90 (min) | | 8.6 | 9.9 | 5.0 | 3.7 |
| Bonding vs fluororesin (1) | | — | Acceptable | Acceptable | Good | Poor |
| 160° C. × 45 min | | | 17 N/cm | 15 N/cm | 20 N/cm | 0 N/cm |
| Bonding vs fluororesin (2) | | — | — | — | — | — |
| 160° C. × 45 min | | | | | | |
| Bonding vs fluororesin (3) | | Good | — | — | — | — |
| 160° C. × 45 min | | 21 N/cm | | | | |
| Bonding vs fluororesin (4) | | — | — | — | — | — |
| 160° C. × 45 min | | | | | | |

TABLE 4

| Type of compounding agent | Name of material | Comparative Example 9 | Example 15 | Comparative Example 10 | Example 16 | Comparative Example 11 |
|---|---|---|---|---|---|---|
| Base polymer | Fluororubber (3) | 100.0 | 100.0 | 100.0 | 100.0 | 100.0 |
| Carbon black | Carbon black (N990) | 20.0 | 20.0 | 20.0 | 20.0 | 20.0 |
| Vulcanizing agent | Triallyl isocyanurate | 4.0 | 4.0 | 4.0 | 4.0 | 4.0 |
| Vulcanizing agent | 2,5-Dimethyl-2,5-di(t-butylperoxy)hexane | 1.5 | 1.5 | 1.5 | 1.5 | 1.5 |
| Calcium hydroxide | Calcium hydroxide | | | | | |
| MgO | Magnesium oxide | | | | | |
| DBU salt | 8-Benzyl-1,8-diazabicyclo(5.4.0)-7-undecenium chloride | | | 2.0 | 2.0 | |
| Melamine | Melamine (rubber chemical 1) | | | | 2.0 | 2.0 |
| Basic multifunctional compound | N,N'-dicinnamylidene-1,6-hexamethylene diamine | | 1.5 | 1.5 | 1.0 | 1.0 |
| Basic multifunctional compound | Hexamethylenediamine | | | | | |
| Amine compound | Dodecylamine | | | | | |
| Basic multifunctional compound | p-Phenylenediamine | 0.9 | | | | |
| Sum | | 126.4 | 129.0 | 129.0 | 128.5 | 128.5 |
| Curelastometer type-II, 160° C. | ML (N) | 1.4 | 0.7 | 0.7 | 0.8 | |
| | MH (N) | 6.9 | 10.8 | 10.8 | 25.3 | 25.3 |
| | T10 (min) | 2.5 | 2.8 | 2.8 | 2.0 | 2.0 |
| | T90 (min) | 13.5 | 12.5 | 12.5 | 5.0 | 5.0 |
| Bonding vs fluororesin (1) | | Poor | Acceptable | — | Good | — |
| 160° C. × 45 min | | 0 N/cm | 17 N/cm | | 25 N/cm | |
| Bonding vs fluororesin (2) | | — | Good | — | Good | — |
| 160° C. × 45 min | | | 22 N/cm | | 26 N/cm | |
| Bonding vs fluororesin (3) | | — | — | Good | — | Good |
| 160° C. × 45 min | | | | 23 N/cm | | 24 N/cm |
| Bonding vs fluororesin (4) | | — | — | — | — | — |
| 160° C. × 45 min | | | | | | |

| Type of compounding agent | Name of material | Comparative Example 12 | Example 17 | Comparative Example 13 | Example 18 | Example 19 |
|---|---|---|---|---|---|---|
| Base polymer | Fluororubber (3) | 100.0 | 100.0 | 100.0 | 100.0 | 100.0 |
| Carbon black | Carbon black (N990) | 20.0 | 20.0 | 20.0 | 20.0 | 20.0 |
| Vulcanizing agent | Triallyl isocyanurate | 4.0 | 4.0 | 4.0 | 4.0 | 4.0 |
| Vulcanizing agent | 2,5-Dimethyl-2,5-di(t-butylperoxy)hexane | 1.5 | 1.5 | 1.5 | 3.0 | 3.0 |
| Calcium hydroxide | Calcium hydroxide | | | | | |
| MgO | Magnesium oxide | | | | | |
| DBU salt | 8-Benzyl-1,8-diazabicyclo(5.4.0)-7-undecenium chloride | 2.0 | | | 2.0 | 2.0 |
| Melamine | Melamine (rubber chemical 1) | 2.0 | 2.0 | 2.0 | | |
| Basic multifunctional compound | N,N'-dicinnamylidene-1,6-hexamethylene diamine | | | 2.0 | 2.0 | 2.0 |
| Basic multifunctional compound | Hexamethylenediamine | | | | | |
| Amine compound | Dodecylamine | | | | | |
| Basic multifunctional compound | p-Phenylenediamine | | | | | |

TABLE 4-continued

|  |  |  |  |  |  |  |
|---|---|---|---|---|---|---|
| Sum |  | 129.5 | 129.5 | 129.5 | 131.0 | 131.0 |
| Curelastometer type-II, 160° C. | ML (N) | 1.3 | 0.9 | 0.9 | 0.5 |  |
|  | MH (N) | 18.2 | 14.3 | 14.3 | 14.1 | 14.1 |
|  | T10 (min) | 0.7 | 2.7 | 2.7 | 2.7 | 2.7 |
|  | T90 (min) | 2.5 | 11.2 | 11.2 | 10.0 | 10.0 |
| Bonding vs fluororesin (1) |  | Poor | Good | — | Good | Good |
| 160° C. × 45 min |  | 0 N/cm | 18 N/cm |  | 21 N/cm | 24 N/cm |
| Bonding vs fluororesin (2) |  | Poor | Good | — | — | — |
| 160° C. × 45 min |  | 0 N/cm | 21 N/cm |  |  |  |
| Bonding vs fluororesin (3) |  | Poor | — | Good | — | — |
| 160° C. × 45 min |  | 0 N/cm |  | 20 N/cm |  |  |
| Bonding vs fluororesin (4) |  | Poor | — | — | — | — |
| 160° C. × 45 min |  | 0 N/cm |  |  |  |  |

TABLE 5

| Type of compounding agent | Name of material | Example 20 |
|---|---|---|
| Base polymer | Fluororubber (4) | 100.0 |
| Carbon black | Carbon black (N990) | 20.0 |
| Vulcanizing agent | Triallyl isocyanurate | 4.0 |
| Vulcanizing agent | 2,5-Dimethyl-2,5-di(t-butylperoxy)hexane | 1.5 |
| Basic multifunctional compound | N,N'-dicinnamylidene-1,6-hexamethylene diamine | 5.0 |
| Sum |  | 130.5 |
| Curelastometer type-II, 160° C. | ML (N) | 2.4 |
|  | MH (N) | 27.2 |
|  | T10 (min) | 3.1 |
|  | T90 (min) | 12.3 |
| Bonding | vs fluororesin (1) | Acceptable |
| 160° C. × 45 min |  | 10 N/cm |

TABLE 6

| Type of compounding agent | Name of material | Example 21 |
|---|---|---|
| Base polymer | Fluororubber (5) | 100.0 |
| Carbon black | Carbon black (N990) | 20.0 |
| Vulcanizing agent | Triallyl isocyanurate | 4.0 |
| Vulcanizing agent | 2,5-Dimethyl-2,5-di(t-butylperoxy)hexane | 1.5 |
| Basic multifunctional compound | N,N'-dicinnamylidene-1,6-hexamethylene diamine | 4.0 |
| Sum |  | 129.5 |
| Curelastometer type-II, 160° C. | ML (N) | 0.2 |
|  | MH (N) | 27.8 |
|  | T10 (min) | 1.5 |
|  | T90 (min) | 11.3 |
| Bonding | vs fluororesin (1) | Acceptable |
| 160° C. × 45 min |  | 18 N/cm |

TABLE 7

| Type of compounding agent | Name of material | Example 22 |
|---|---|---|
| Base polymer | Fluororubber (6) | 100.0 |
| Carbon black | Carbon black (N990) | 20.0 |
| Vulcanizing agent | Triallyl isocyanurate | 4.0 |
| Vulcanizing agent | 2,5-Dimethyl-2,5-di(t-butylperoxy)hexane | 1.5 |
| Basic multifunctional compound | N,N'-dicinnamylidene-1,6-hexamethylene diamine | 6.0 |
| Sum |  | 131.5 |
| Curelastometer type-II, 160° C. | ML (N) | 0.5 |
|  | MH (N) | 18.8 |
|  | T10 (min) | 3.6 |
|  | T90 (min) | 11.0 |
| Bonding | vs fluororesin (1) | Acceptable |
| 160° C. × 45 min |  | 6 N/cm |

TABLE 8

| Type of compounding agent | Name of material | Comparative Example 14 |
|---|---|---|
| Base polymer | Fluororubber (7) | 100.0 |
| Carbon black | Carbon black (N990) | 20.0 |
| Vulcanizing agent | Triallyl isocyanurate | 4.0 |
| Vulcanizing agent | 2,5-Dimethyl-2,5-di(t-butylperoxy)hexane | 1.5 |
| Basic multifunctional compound | N,N'-dicinnamylidene-1,6-hexamethylene diamine | 3.0 |
| | Sum | 128.5 |
| Curelastometer type-II, 160° C. | ML (N) | 1.5 |
| | MH (N) | 31.3 |
| | T10 (min) | 2.4 |
| | T90 (min) | 6.8 |
| Bonding | vs fluororesin (1) | Poor |
| 160° C. × 45 min | | 2 N/cm |

INDUSTRIAL APPLICABILITY

Since the fluororubber layer (A) and the fluororesin layer (B) are excellently bonded and the fluororesin layer (B) has a low fuel permeability coefficient in the laminate of the present invention, the laminate of the present invention can be particularly suitably used as a hose for fuel, an oil seal, an O-ring, a packing, or the like.

The invention claimed is:

1. A laminate comprising:
a fluororubber layer (A); and
a fluororesin layer (B) stacked on the fluororubber layer (A),
the fluororubber layer (A) being a layer formed from a fluororubber composition,
the fluororubber composition containing a fluororubber (a1), a peroxide vulcanizing agent, a triallyl isocyanurate and a basic multifunctional compound having at least two nitrogen atoms in the molecule with a distance between the nitrogen atoms in the molecule of 5.70 Å or greater,
the fluororubber (a1) having an absorption coefficient at 1720 cm$^{-1}$, determined after being brought into contact with triethyl amine, of 0.35 or lower,
the fluororesin layer (B) being formed from a fluororesin (b1) having a fuel permeability coefficient of 2.0 g·mm/m$^2$/day or lower,
wherein the fluororesin (b1) is at least one selected from the group consisting of polychlorotrifluoroethylene and a chlorotrifluoroethylene (CTFE)-containing copolymer,
wherein the CTFE-containing copolymer includes a CTFE unit, a TFE unit, and a monomer (a) unit derived from a monomer (a) copolymerizable therewith, and the sum of the amounts of the CTFE unit and the TFE unit is 90 to 99.9 mol % and the amount of the monomer (a) unit is 0.1 to 10 mol %,
wherein the monomer (a) is at least one selected from the group consisting of perfluoro (alkyl vinyl ether) (PAVE) and hexafluoropropylene (HFP), and
wherein the amount of peroxide vulcanizing agent is 0.1 to 15 parts by mass for 100 parts by mass of the fluororubber (a1).

2. The laminate according to claim 1,
wherein the fluororubber (a1) is at least one selected from the group consisting of a vinylidene fluoride/CH$_2$=CFRf$^1$ copolymer wherein Rf$^1$ is a C1-C12 linear or branched fluoroalkyl group, a tetrafluoroethylene/propylene copolymer, a tetrafluoroethylene/propylene/vinylidene fluoride copolymer, an ethylene/tetrafluoroethylene/perfluoro(alkyl vinyl ether) copolymer, a vinylidene fluoride/hexafluoropropylene/tetrafluoroethylene/perfluoro(alkyl vinyl ether)/ethylene copolymer, a vinylidene fluoride/hexafluoropropylene copolymer, and a vinylidene fluoride/hexafluoropropylene/tetrafluoroethylene copolymer.

3. The laminate according to claim 1,
wherein the basic multifunctional compound has two or more functional groups selected from —NH$_2$, —NH$_3^+$, —NHCOOH, —NHCOO$^-$, —N=CR$^1$R$^2$ wherein R$^1$ and R$^2$ are each individually a C0-C12 organic group, —NR$^3$R$^4$ wherein R$^3$ and R$^4$ are each individually a C0-C12 organic group, and —NR$^3$R$^4$R$^5$ wherein R$^3$, R$^4$, and R$^5$ are each individually a C0-C12 organic group.

4. The laminate according to claim 1,
wherein the basic multifunctional compound has two or more functional groups selected from —NH$_2$, —NH$_3^+$, —N=CR$^1$R$^2$ wherein R$^1$ and R$^2$ are each individually a C0-C12 organic group, and —NR$^3$R$^4$R$^5$ wherein R$^3$, R$^4$, and R$^5$ are each individually a C0-C12 organic group.

5. The laminate according to claim 1,
wherein the basic multifunctional compound is at least one selected from the group consisting of N,N'-dicinnamylidene-1,6-hexamethylenediamine and NH$_2$—(CH$_2$)$_n$—NH$_2$ wherein n is 5 to 12.

6. The laminate according to claim 1,
wherein the basic multifunctional compound is at least one selected from the group consisting of N,N'-dicinnamylidene-1,6-hexamethylenediamine and hexamethylenediamine.

7. The laminate according to claim 1,
wherein the fluororubber layer (A) is stacked on both sides of the fluororesin layer (B).

8. The laminate according to claim 1,
wherein the fluororesin layer (B) is stacked on both sides of the fluororubber layer (A).

9. The laminate according to claim 1, further comprising a fluorine-free rubber layer (C1a),
wherein the fluororubber layer (A), the fluororesin layer (B), and the fluorine-free rubber layer (C1a) are stacked in the order set forth.

10. The laminate according to claim 9, further comprising a fluorine-free rubber layer (D1a),
wherein the layers are stacked in the order of the fluorine-free rubber layer (D1a), the fluororubber layer (A), the fluororesin layer (B), and the fluorine-free rubber layer (C1a); in the order of the fluororubber layer (A), the fluororesin layer (B), the fluorine-free rubber layer (D1a), and the fluorine-free rubber layer (C1a); or in the order of the fluororubber layer (A), the fluororesin layer (B), the fluorine-free rubber layer (C1a), and the fluorine-free rubber layer (D1a).

11. The laminate according to claim 1,
wherein the fluororubber layer (A) and the fluororesin layer (B) are vulcanization-bonded to each other.

12. A method for manufacturing a laminate comprising:
mixing a fluororubber (a1), a peroxide vulcanizing agent, a triallyl isocyanurate, and a basic multifunctional compound having at least two nitrogen atoms in the molecule with a distance between the nitrogen atoms in the molecule of 5.70 Å or greater to provide a fluororubber composition;
stacking an unvulcanized fluororubber layer prepared by molding the fluororubber composition and a fluororesin layer; and
vulcanizing the unvulcanized fluororubber layer and the fluororesin layer stacked,
the fluororubber composition containing the fluororubber (a1), the peroxide vulcanizing agent, and the basic multifunctional compound,
the fluororubber (a1) having an absorption coefficient at 1720 cm$^{-1}$, determined after being brought into contact with triethyl amine, of 0.35 or lower,
the fluororesin layer being formed from a fluororesin (b1) having a fuel permeability coefficient of 2.0 g·mm/m$^2$/day or lower,
wherein the fluororesin (b1) is at least one selected from the group consisting of polychlorotrifluoroethylene and a chlorotrifluoroethylene (CTFE)-containing copolymer,
wherein the CTFE-containing copolymer includes a CTFE unit, a TFE unit, and a monomer (a) unit derived from a monomer (a) copolymerizable therewith, and the sum of the amounts of the CTFE unit and the TFE unit is 90 to 99.9 mol % and the amount of the monomer (a) unit is 0.1 to 10 mol %,
wherein the monomer (a) is at least one selected from the group consisting of perfluoro (alkyl vinyl ether) (PAVE) and hexafluoropropylene (HFP), and
wherein the amount of peroxide vulcanizing agent is 0.1 to 15 parts by mass for 100 parts by mass of the fluororubber (a1).

* * * * *